Oct. 1, 1957 R. C. BERGHELL 2,808,107

TABULATING CARD REPRODUCING PUNCH

Filed Aug. 25, 1954 10 Sheets-Sheet 1

INVENTOR.

ROBIN COLLINGWOOD BERGHELL

BY Fulwider, Mattingly & Huntley

Attorneys

TABULATING CARD REPRODUCING PUNCH

Filed Aug. 25, 1954

INVENTOR.
ROBIN COLLINGWOOD BERGHELL
BY Fulwider Mattingly & Huntley
Attorneys

INVENTOR.
ROBIN COLLINGWOOD BERGHELL
BY Fulwider Mattingly & Huntley
Attorneys

Oct. 1, 1957 R. C. BERGHELL 2,808,107

TABULATING CARD REPRODUCING PUNCH

Filed Aug. 25, 1954 10 Sheets-Sheet 4

INVENTOR.
ROBIN COLLINGWOOD BERGHELL
BY Fulwider, Mattingly & Huntley
Attorneys

INVENTOR.
ROBIN COLLINGWOOD BERGHELL
BY Fulwider Mattingly & Huntley
Attorneys

INVENTOR.
ROBIN COLLINGWOOD BERGHELL
BY Fidwider Mattingly & Huntley
Attorneys.

INVENTOR.
ROBIN COLLINGWOOD BERGHELL
BY Fulwider Mattingly & Huntley
Attorneys

INVENTOR.

ROBIN COLLINGWOOD BERGHELL

BY Fulwider Mattingly & Huntley

Attorneys

Oct. 1, 1957 R. C. BERGHELL 2,808,107

TABULATING CARD REPRODUCING PUNCH

Filed Aug. 25, 1954 10 Sheets-Sheet 9

INVENTOR.
ROBIN COLLINGWOOD BERGHELL
BY Edwards, Mattingly & Huntley
Attorneys

INVENTOR.
ROBIN COLLINGWOOD BERGHELL
BY Zulinder, Mattingly & Huntley
Attorneys

United States Patent Office

2,808,107
Patented Oct. 1, 1957

2,808,107

TABULATING CARD REPRODUCING PUNCH

Robin Collingwood Berghell, Los Angeles, Calif.

Application August 25, 1954, Serial No. 452,076

24 Claims. (Cl. 164—114)

The present invention relates generally to apparatus for recording and handling statistical data and more particularly to apparatus of that type in which the data are recorded on punched cards.

While the invention will be illustrated and described herein as embodied in a unit for preparing job time records, such as are required in the computation and presentation of manufacturing costs, it will be realized that the invention has a much broader application in the general field of automatic data handling equipment.

The use of punched-card and allied tabulating and computing machines has greatly facilitated the rapid and accurate handling of large quantities of statistical data. Such machines are in wide use, for example in bookkeeping, accounting, labor distribution, and manufacturing control and the methods employing such equipment not only effect a great saving in time, but eliminate many opportunities for human error.

Notwithstanding the substantial advances in the above-mentioned fields which have been made possible through the use of automatic data handling equipment of the class described, the practices that have been developed prior to my invention still involve a considerable amount of lost time in the duplication of the original data records as punched cards which the computing, tabulating, and accounting machines thereafter process.

For example, the general practice prior to my invention, has been first to record data on written or printed records and thereafter to transfer the information on such visual records to coded punched cards, tapes, or the like which are thereafter fed through the data processing machines. Thus, in one of the fields where punched card tabulation is particularly useful, that is the field of labor distribution and cost analysis, the punched cards have usually been prepared one at a time by operators reading from one or more original printed time cards and similar records, such operators reproducing the information on the coded punched cards. To appreciate the magnitude of the problem dealt with by the present invention, it should be noted that a single shop order in a reasonably large manufacturing operation may generate as many as a thousand hand-written copies of all or portions of the original order.

It will be appreciated that data transferring operations of the type generally described are not only time consuming, but leave a very substantial opportunity for human error. For example, the operation is not only subject to the normal human errors in reading the printed record, and operating the punching machine, but where information from several sources is to be combined upon a single card, it is not infrequent that the data are improperly combined.

It will be appreciated that the prior procedures involving the use of hand-written original data are wasteful of time not only because it is necessary to transfer the data to punched cards, for example for automatic data handling equipment, but a considerable amount of time is lost in the preparation of the original written records. Also, such hand-written records are subject to numerous errors in the original entries. As will be described, my invention obviates such loss of time and inaccuracy.

Similar problems exist in the use of automatic accounting machines for the preparation of monthly statements to customers of large chain stores, gasoline stations and similar establishments employing so-called credit cards or charge plates. Here the original sales record is usually written out by hand by the sales person and may be stamped with the purchaser's charge plate. Thereafter, the information contained on the sales slips is transferred to punched cards which are then processed by automatic accounting machines to produce monthly statements of account. Here again the opportunity for human error and the time lost in the information transfer operations, is substantial.

Bearing in mind the difficulties above-mentioned, it is a major object of the present invention to provide a relatively simple data recording unit, which may be used by timekeepers, sales persons, and the like to produce, at the time of the original transaction to be recorded, a permanent data record which may thereafter be used directly in automatic data handling equipment. More specifically, the invention is embodied in a simple card punching unit for producing such original data cards.

It is another object of the present invention to provide apparatus for reproducing in one operation on a single punched card, data from several sources, e. g., two or more punched master cards or charge plates.

It is a further object of the invention to provide a recording punching unit of the class described which records in a single operation on a single card, two types of data, for example so-called static or identifying information from one master card and variable information such as time and date, serial number of the transaction, amount of sale and the like from a separate source.

It is still another object of the invention to provide apparatus of the class described in which information on one punched card may, in a single operation, be transferred to another similar punched card without damaging or destroying the original card.

Still further it is an object of the invention to provide apparatus of the class described in which information is recorded in two modes in a single operation, that is for example, as a directly readable printed record and simultaneously as a pattern of punched holes.

It is an additional object of the invention to provide apparatus of the class described which is relatively inexpensive and easily operated and serviced, yet foolproof and safe to operate.

It is still a further object of the invention to provide apparatus for eliminating the necessity of handwritten original records and to provide for the automatic and exact duplication of punched card records from master cards, thus to eliminate the possibility of error in copying.

Still another object of the invention is to provide apparatus of the class described which is adapted to be readily synchronized with other similar units, for example, time recording stations in large manufacturing facilities.

To facilitate a better understanding of the detailed description to follow, a brief outline of one of the data handling procedures employing the present invention should first be considered. The embodiment chosen to illustrate the present invention and described in detail hereinafter, is a card punching unit to be used by timekeepers in recording the labor time and other pertinent data involved in the various steps or manufacturing operations in an overall production program.

The procedure used is briefly as follows: Certain items of permanent identifying information termed herein "static" information, involved in a given manufacturing operation are recorded on one or more identical "master" cards. Static information would include, for example, the part number to be manufactured, the number of pieces, the machine operations involved, the shop order to be charged, and the like.

Shop orders are issued containing the instructions to the workmen who are to perform the actual manufacturing operations and to each shop order is attached one of the above described master cards. A workman then takes the master card and his personal identification card bearing his particular clock number to the timekeeper for the purpose of "punching in." The timekeeper places the master card and the workman's identification card in an appropriate receptacle in a punching unit embodying the present invention, and actuates the same in a manner hereinafter described to "punch in," i. e., to produce a record timecard on which is reproduced in a punched hole pattern, (1) pertinent information from the master card, (2) pertinent information from the workman's identification card, and (3) the "time in" including the date. This punching-in operation also prints the "in" time and the workman's name and clock number on a stub portion of the timecard.

After punching-in the workman proceeds with the job at hand and the timekeeper retains the timecard pending completion of the job. When the job is completed and the workman reports back to the timekeeper, the latter again places the timecard in the punching unit and actuates it in a manner to record the "out" time. To facilitate visual identification of the timecard at this stage, the out time is recorded on the timecard both as a punched hole pattern and as a printed record.

At the end of each work shift, the timekeeper date stamps all timecards and sends them to the tabulating department where stubs bearing the printed indicia are removed and the timecard portions bearing the punched hole data are automatically processed by conventional tabulating and computing equipment to extend the hourly pay rates, compute the elapsed time, and determine the labor cost for each job to the date of such computation.

It will be appreciated that the above procedure has a great many advantages, among them the elimination of substantially all opportunities for clerical error in the keeping and handling of time records, and a great saving of time. The saving of time in turn makes possible accurate running checks on labor costs and work progress, which are not possible under the conventional methods which involve the transfer of written data to punched card records.

The foregoing and additional objects and advantages of the invention will appear from the following detailed description of the illustrative embodiment, consideration being given also to the attached drawings in which.

Figures 1, 2:
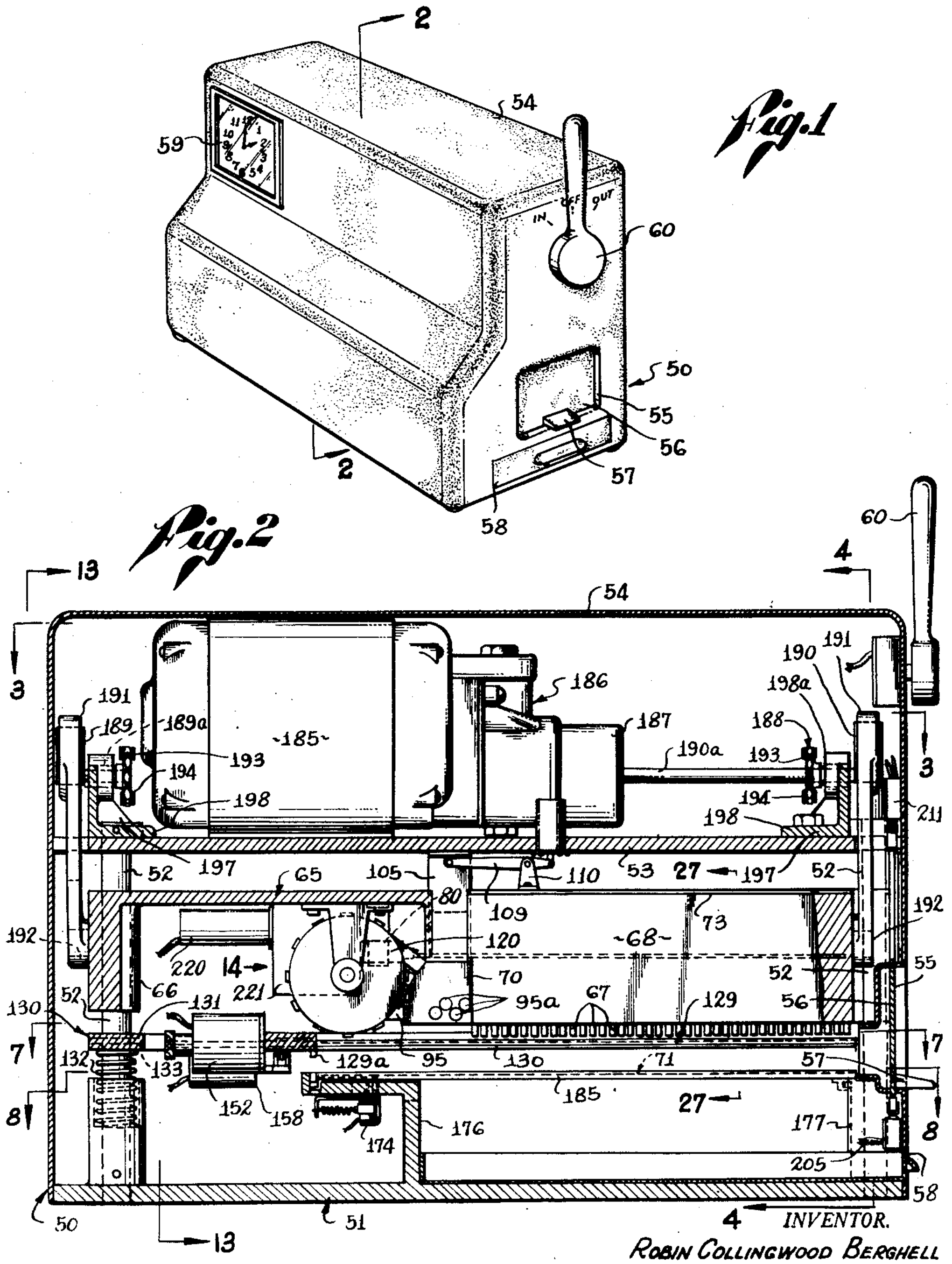
Figure 1 is a perspective view of a card punching unit embodying the present invention.
Figure 2 is an elevational section taken on the line 2—2 in Figure 1.
Figures 7, 7A, 8, 12:
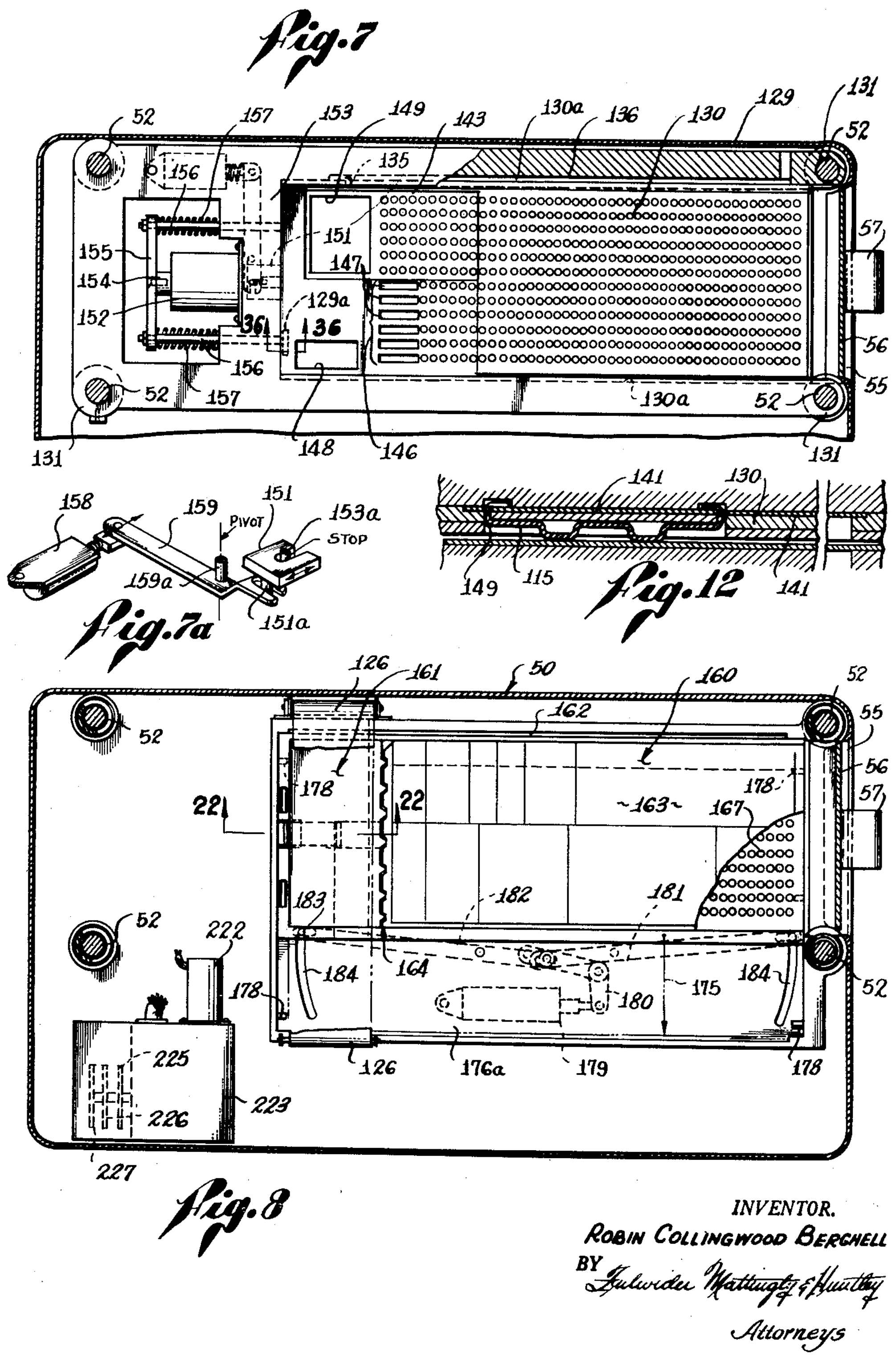
Figure 7 is a fragmentary horizontal section taken on the line 7—7 in Figure 2.
Figure 10:
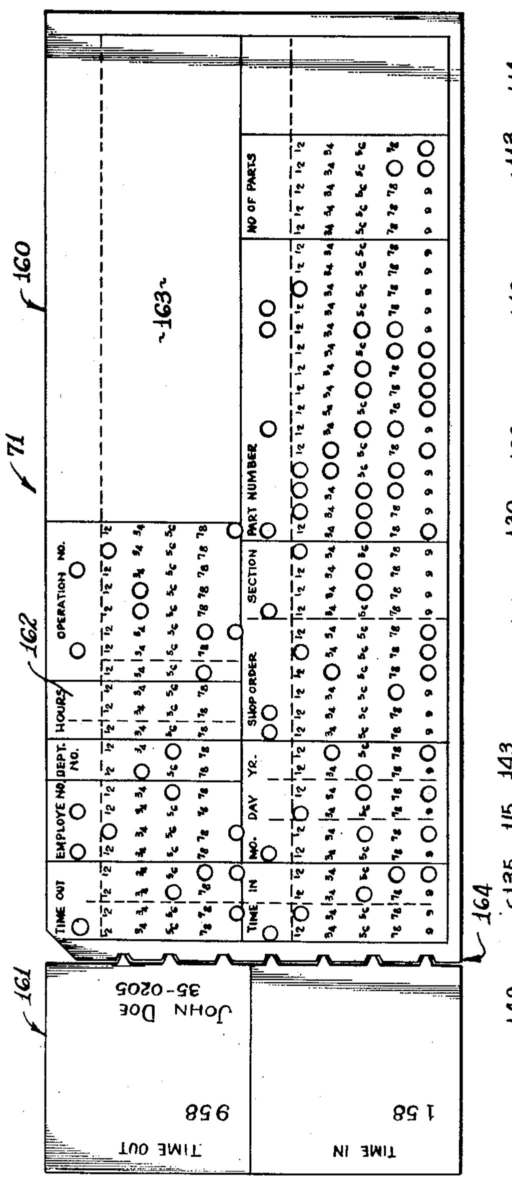
Figures 9, 11:
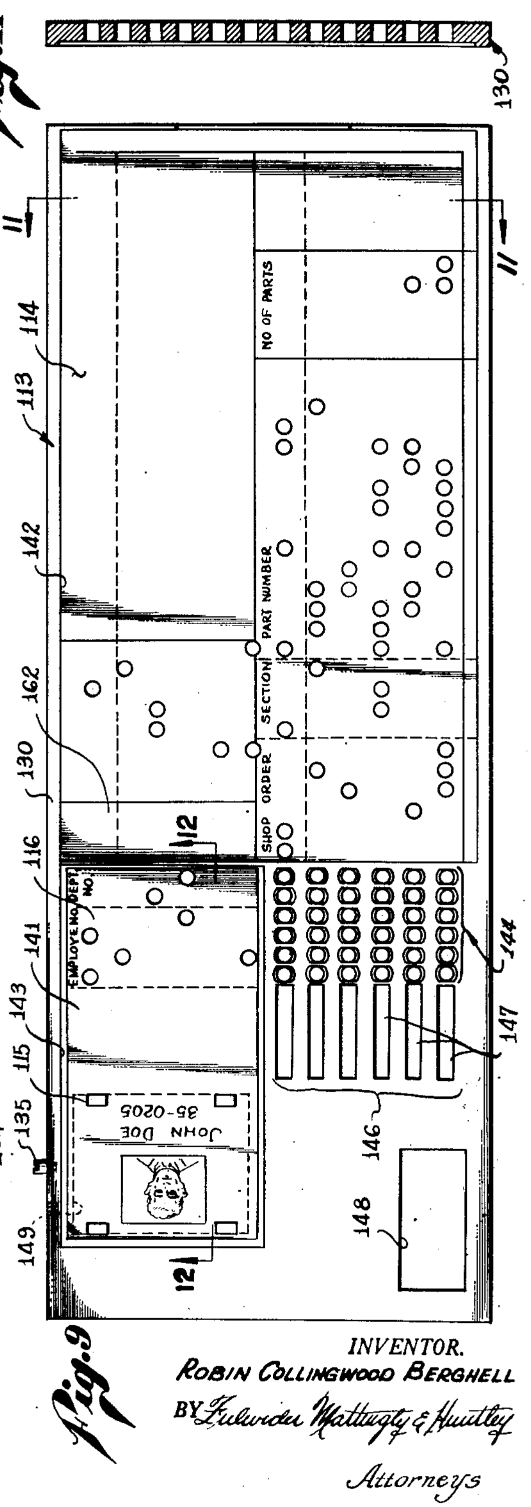
Figure 13:
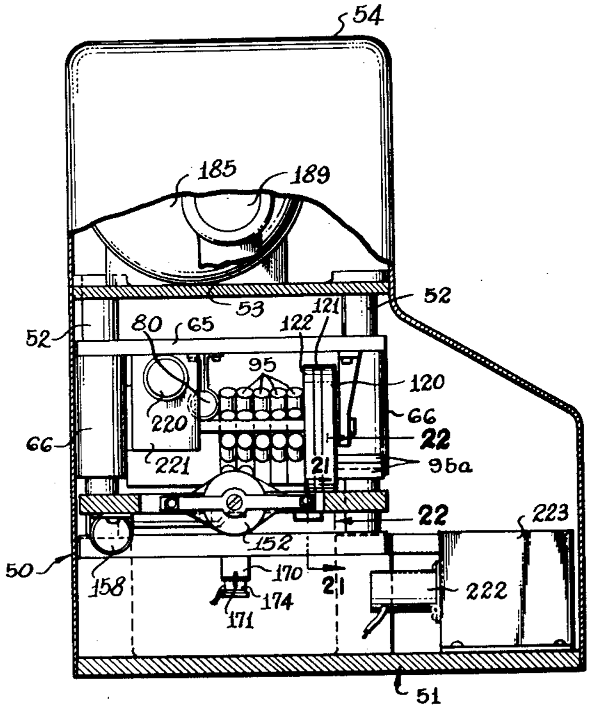
Figure 36:
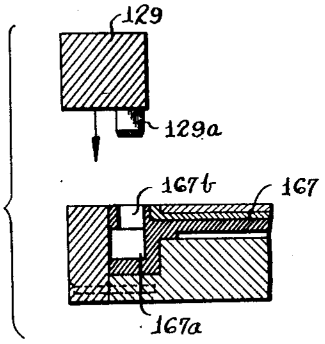
Figure 37:
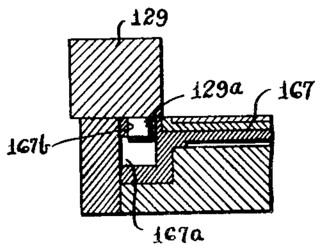
Figures 14, 15, 16, 17, 18, 19, 20, 21:
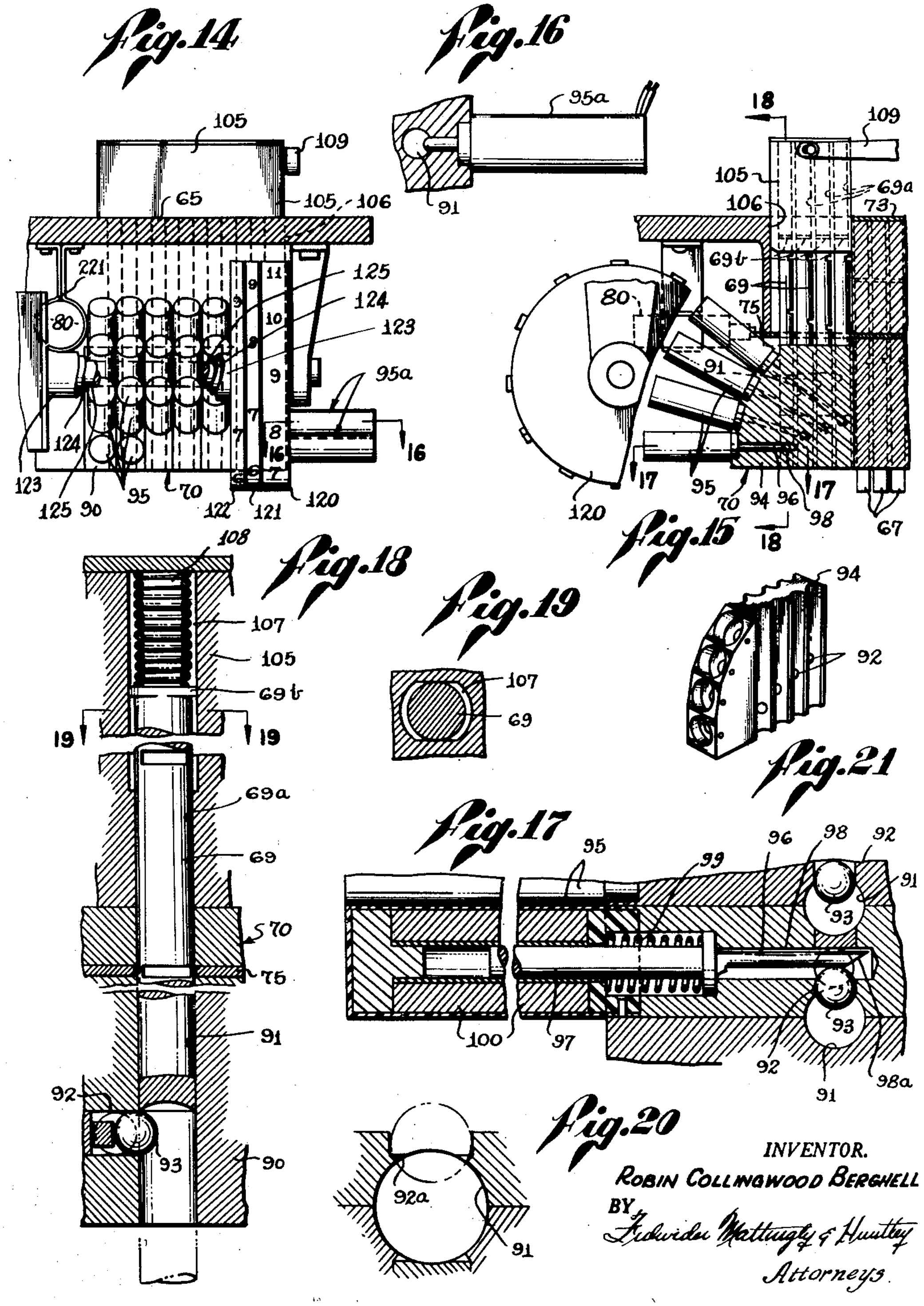
Figures 22, 23:
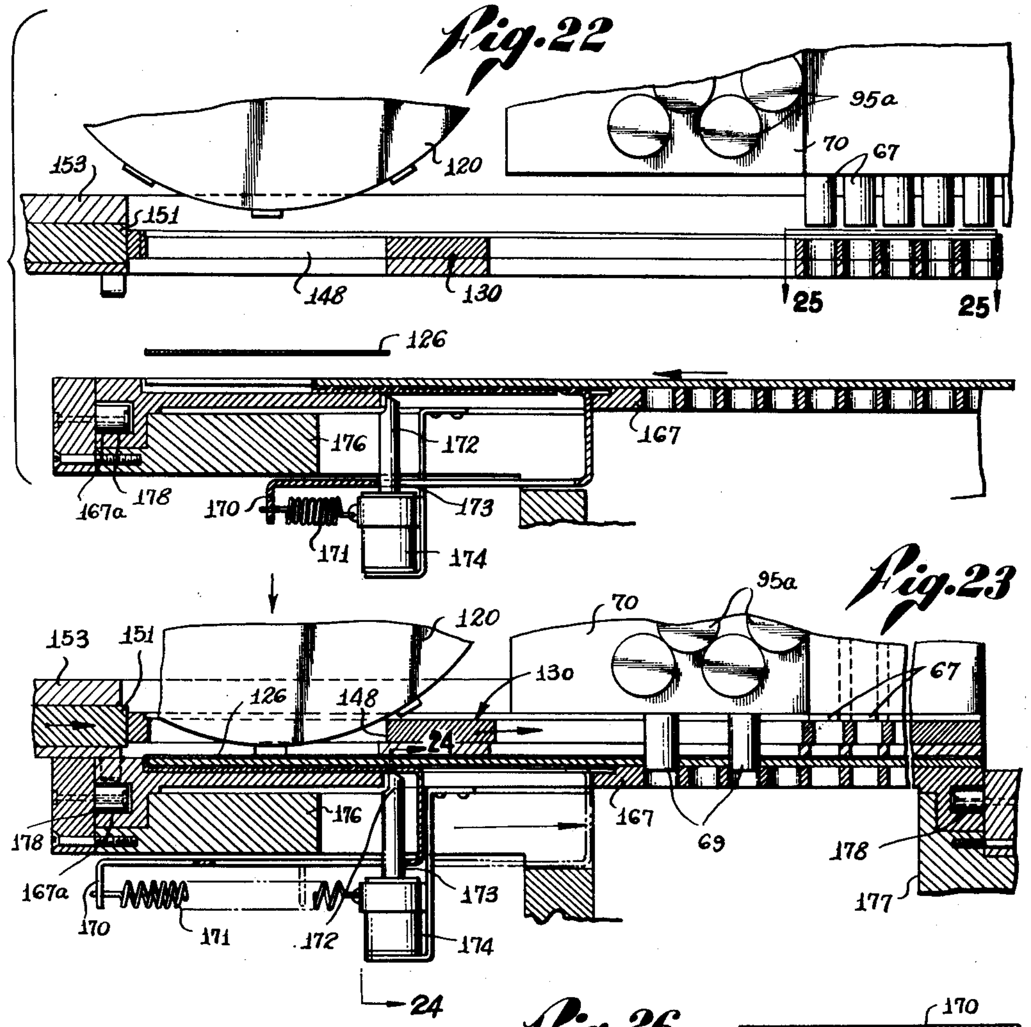
Figure 25:
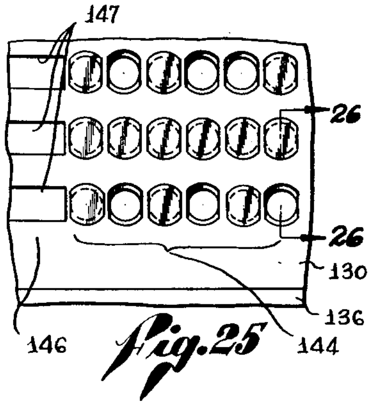
Figure 26:
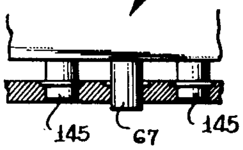
Figure 24:
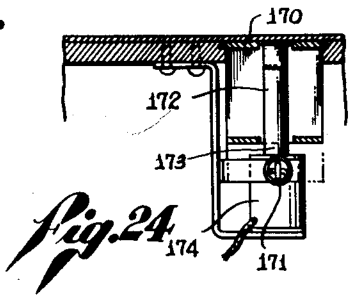
Figure 27:
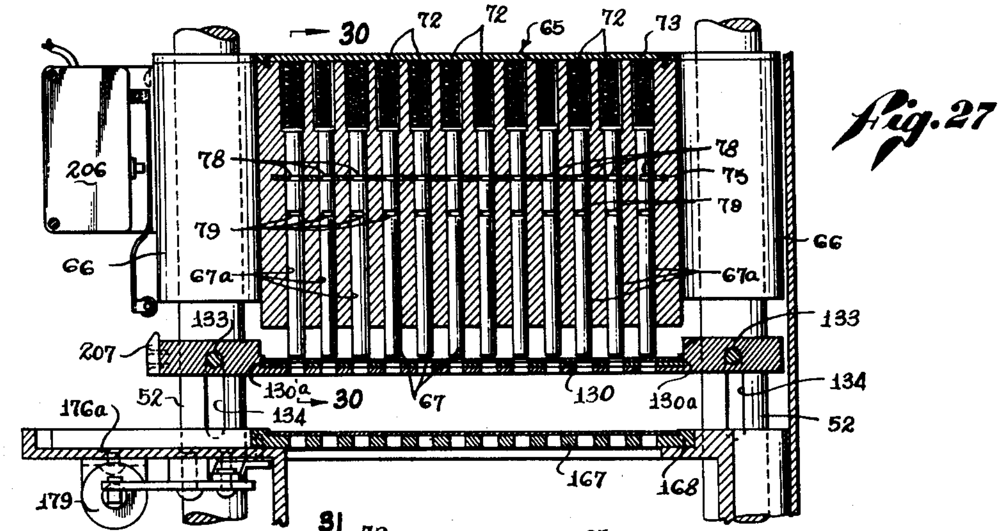
Figure 28:
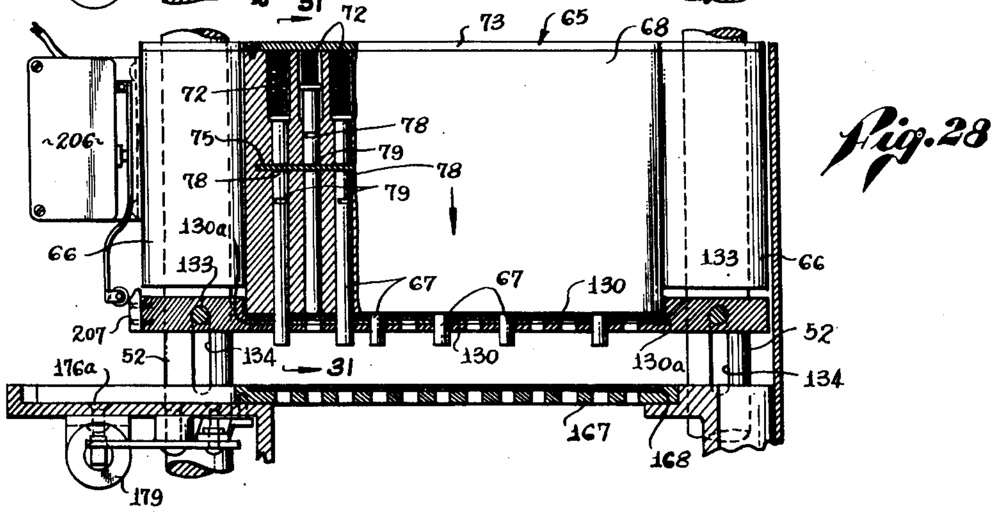
Figure 29:
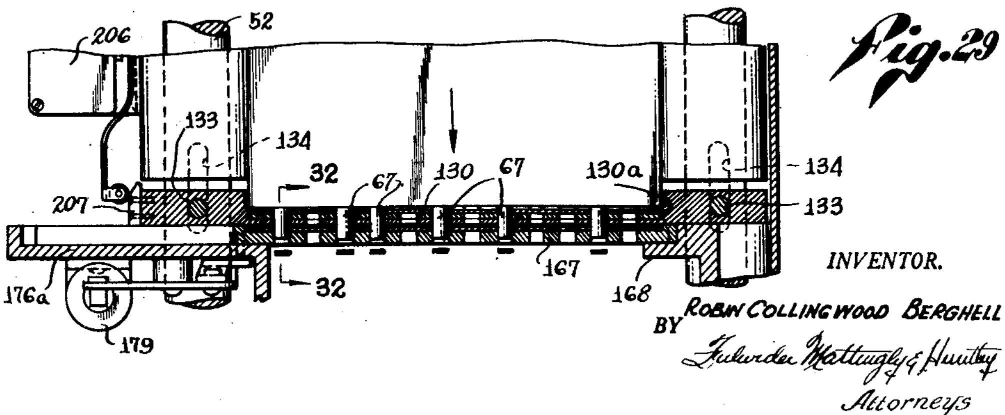
Figure 30:
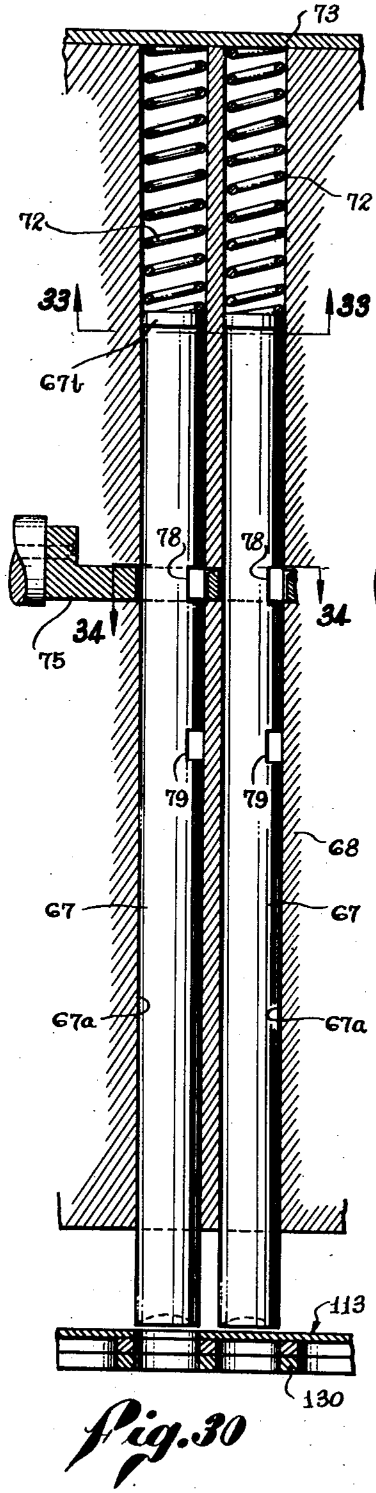
Figures 31, 32, 34, 35:
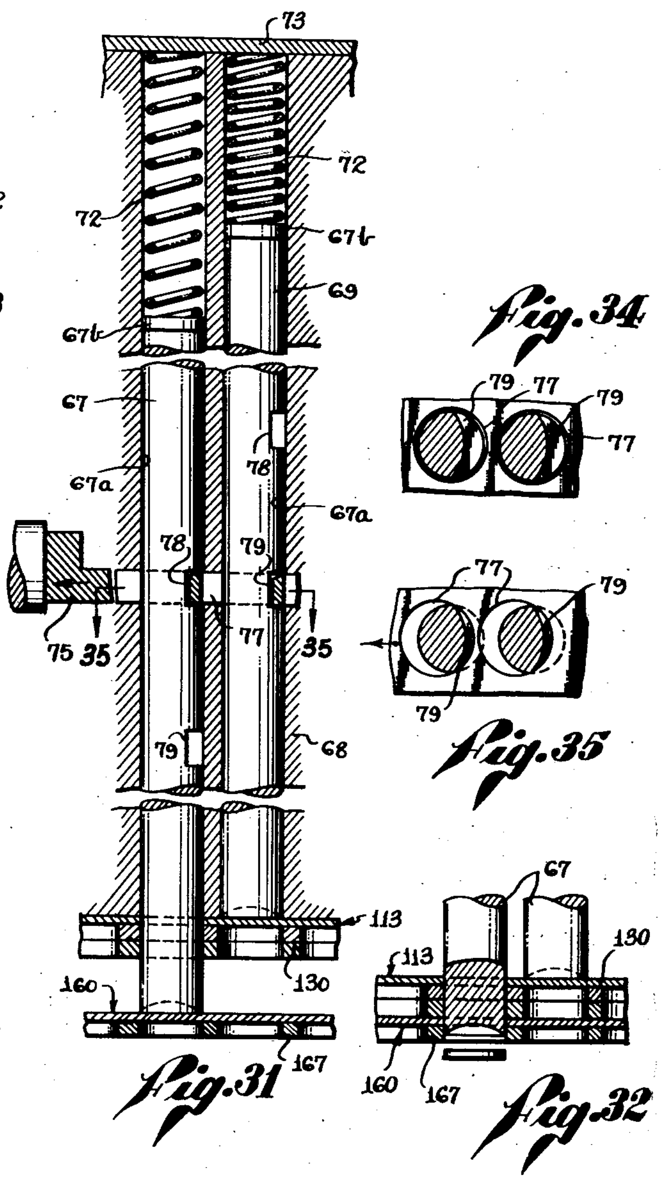
Figure 33:
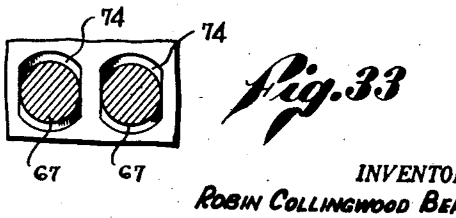
Figure 38:
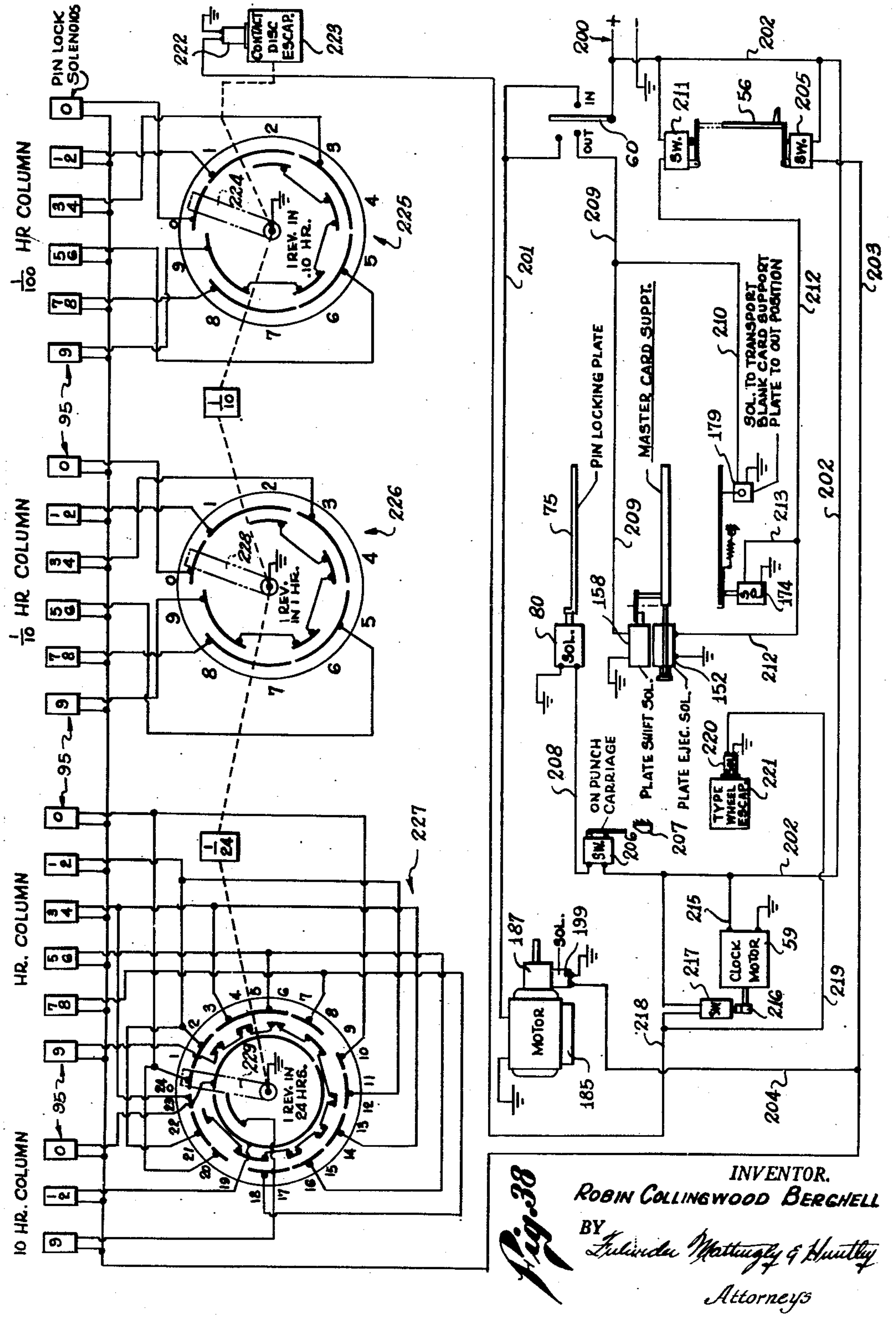

Figure 7*a* is a perspective view of a sub-assembly comprising a shifting mechanism incorporated in Figure 7;

Figure 8 is a horizontal section taken on the line 8—8 in Figure 2;

Figure 9 is a plan view of a master card and identification card used in connection with the apparatus shown in Figure 1, also showing a portion of the mechanism for supporting said cards;

Figure 10 is a plan view of a record card produced by the unit illustrated in Figure 1;

Figure 11 is an elevational section taken on the line 11—11 in Figure 9;

Figure 12 is an elevational section taken on the line 12—12 in Figure 9;

Figure 13 is an elevational end view of the unit shown in Figure 1 with a portion of the view sectioned on the line 13—13 in Figure 2;

Figure 14 is an enlarged elevational fragmentary view as seen from the direction of the arrow 14 in Figure 2;

Figure 15 is an enlarged portion of the parts as shown in Figure 2 with portions broken away to show the underlying parts;

Figure 16 is a horizontal section taken on the line 16—16 in Figure 14;

Figure 17 is a horizontal section taken on the line 17—17 in Figure 15;

Figure 18 is an enlarged elevational section taken on the line 18—18 in Figure 15;

Figure 19 is a horizontal section taken on the line 19—19 in Figure 18;

Figure 20 is an enlarged view of a portion of Figure 17 illustrating the detail shape of a part therein;

Figure 21 is a perspective view of an individual part making up the assembly illustrated in Figures 14 and 15;

Figures 22 and 23 are sequential operational views, being enlarged sections taken generally on the line 22—22 in Figure 13;

Figure 24 is an elevational section taken on the line 24—24 in Figure 23;

Figure 25 is a horizontal section taken on the line 25—25 in Figure 22;

Figure 26 is an elevational section taken on the line 26—26 in Figure 25;

Figures 27, 28, and 29 are sequential operational views being enlarged sections taken on the line 27—27 in Figure 2;

Figure 30 is an enlarged elevational section taken on the line 30—30 in Figure 27;

Figure 31 is an enlarged elevational section taken on the line 31—31 in Figure 28;

Figure 32 is an enlarged elevational section taken on the line 32—32 in Figure 29;

Figure 33 is a horizontal section taken on the line 33—33 in Figure 30;

Figures 34 and 35 are sections taken on the lines 34—34 in Figure 30, and 35—35 in Figure 31, respectively;

Figures 36 and 37 are enlarged elevational sections taken on the line 36—36 in Figure 7; and Figure 38 is a schematic wiring diagram showing the electrical and functional interconnection of the parts shown in previous figures.

For purposes of the following detailed description, the card punching unit embodying the present invention is divided into a number of sub-assemblies, each sub-assembly dealing with the group of structurally or functionally related parts. The principal sub-assemblies are listed as follows:

I. Chassis and housing assembly
II. Punch carriage assembly
III. Master card and support assembly therefor
IV. Record card and support assembly therefor
V. Punch drive assembly
VI. Control and operational sequencing assembly and circuit The major sub-assemblies will be discussed in the order above listed.

*Chassis and housing assembly*

Throughout the drawings, the punch unit is designated generally by the reference character 50. The fixed portion of the unit 50 will be seen to comprise a horizontal base 51 supporting four vertical posts 52, which in turn support a motor platform 53 on their upper ends. An external housing 54 encloses the entire unit and has an opening 55 in the right hand end, which opening is closable by a vertically sliding door 56 provided with an operating handle 57. Master cards, identification cards, and blank cards to be punched are all inserted and removed through the opening 55 by raising the door 56.

Below the opening 55 is slidable drawer or tray member 58, which is arranged to catch and remove the punchings from the blank cards. Mounted in the front surface of the housing 54 is a conventional electrically driven clock 59 which may read in twelve-hour periods as shown on the drawings or alternatively may be of the conventional twenty-four-hour variety.

Mounted on the right hand end of the housing 54 immediately above the opening 55 is an operating switch lever 60, which may be rotated forwardly to "punch-in" or rearwardly to "punch-out." Normally, the operating lever 60 is in a vertical or "off" position as shown in Figure 1.

*Punch carriage*

The punching operation hereinafter described, involves punching all of the holes to be punched, in a single operation using a gang punch comprised of a plurality of parallel punch pins 67 and 69 arranged in banks as will be described. All of the punch pins 67 and 69 are carried on a punch carriage 65, which is a generally horizontal frame structure supported for vertically sliding movement on the posts 52 by four bearing sleeves 66 arranged at the four corners of the carriage 65.

The array of punch pins 67 and 69 is supported in a generally rectangular pin box 68 with the lower or punching ends of certain of the pins 67 projecting below the surface of the pin box 68, as shown in Figure 2. Certain other punch pins 69 which serve to punch the hourly time indication into the blank card as will be described in more detail hereinafter, are supported in a gated portion 70 of the pin box 68, as can be seen at the left end of the pin box 68 in Figure 2. The hour time punching pins 69, do not normally project below the surface of the pin box 68 during the retracted or non-punching condition of the apparatus.

As may be seen in Figure 10, a record card 71 produced by the punching unit 50 carries the recorded information in the form of a number of vertical columns containing punched holes located at various positions in the column, as will be described hereinafter. The number and position of holes in any particular column is an indication of the numerical digit or letter indicated in that column.

Sufficient punch pins 67 and 69 are provided in the pin box 68 to punch holes in all of the possible positions in the record card 71.

As can be seen best in Figures 27 through 29, the punch pins 67 are each carried in a vertical bore 67*a* in the pin box 68, and each is biased downwardly by a compression spring 72 contained in the upper portion of the bore 67*a*, the upper ends of the springs 72 being anchored against a cover plate 73 secured to the upper surface of the pin box 68. Each of the punch pins 67 has a head 67*b* formed on the upper end to limit the downward movement of the pin urged by the spring 72, the head moving in a vertically broached enlarged portion 74 of each bore.

During the punching operation later to be described herein, it is desired to lock the various pins 67 and 69 in either of two positions i. e., a non-punching or "up" position or a "down" position in which that particular pin punches a hole in the blank card when the punch carriage is moved downwardly as will be described.

The locking function just described is performed by a horizontally slidable locking plate 75 mounted within the body of the pin box 68. The locking plate 75 extends over the entire horizontal cross-sectional area occupied by the pins 67 and 69 and is perforated at appropriate points to permit the passage of the punch pins therethrough as shown at 77 in Figures 34 and 35. Each of the punch pins 67 and 69 has formed therein a pair of lateral notches 78 and 79 so positioned that if the locking plate is moved laterally as indicated in Figure 35, an edge of the aperture 77 will enter the notch and prevent further vertical movement of such pin with respect to the bore in which it is carried.

Since the heads 67*b* on the upper ends of each pin 67 and the broached bore in which such heads are carried are flattened on the sides as shown in Figure 33, the pins 67 cannot rotate in the bores and thus the notches 78 and 79 are maintained on the same side of each respective pin 67 at all times.

Thus it will be seen by moving the locking plate 75 horizontally as indicated by the arrow in Figure 31, the pins 67 and 69 are all locked in their then positions and are held in either "up" or "down" position depending in each case upon whether the particular pin was up or down when the lock plate was actuated. As will be described in more detail hereinafter, at the time the locking plate 75 is moved, the various pins have been moved to and are held in either up or down position by the contact of the lower ends thereof with the master card or with other means to be described.

The locking plate 75 is actuated by a solenoid 80 which when energized moves the plate longitudinally to the left (in Figure 2) to lock the pins as above described. The plate 75 is normally held in its unlocked position by a return spring (not shown) of the solenoid 80.

The punch pattern code system employed in the particular system herein described requires a total of six pins for each significant figure to be indicated where the possible digits are to be any of "0" to "9." Where only three possible digits are to appear in a given position, only three pins are required (e. g. "0," "1," or "2" in the ten-hour column of a time designation). Thus in order to indicate time to the closest $\frac{1}{100}$ of an hour throughout any twenty-four-hour period, a total of twenty-one time punching pins 69 are required in the present unit.

The time punching pins 69 are locked in either "up" or "down" position by the locking plate 75 engaging in notches therein in the same manner as previously described in connection with the static information pin 67. Additionally however, the gate means carried in the gating assembly 70 serve to deactivate or block all of the pins 69, except those required to punch the time of a given operation.

The details of the gating asesmbly 70 are best seen in Figures 14 through 21. The gating assembly 70 includes a sectional block 90 having formed therein a plurality of parallel bores 91, which carry the time punching pins 69. In a plurality of lateral passageways 92 one intersecting each of the vertical bores 91, are carried gate-balls 93 which have limited motion in the passages 92 so as to either intrude into the vertical bore 91 or be withdrawn therefrom as will be described. When the ball 93 adjacent any particular bore 91 projects into the bore as shown for example in Figure 18, the punch pin 69 in such bore is blocked from any downward motion.

To facilitate the fabrication of the gating assembly 70, the same is made up of a number of separate sections 94 secured together in side-by-side relationship. The lateral passageways 92 are restricted adjacent their opening in to the adjacent passageway 91 as shown at 92*a* in Figure 20 whereby to prevent the balls from falling into the passageway 91 and out the bottom thereof.

The locking and unlocking movement of the balls 93 is controlled by a plurality of solenoids 95 and 95*a* mounted to the left end and to the front of the gating assembly 70 as can be seen in Figures 14, 15, and 16 each solenoid 95 having an actuating rod 96 connected to its armature 97 and projecting through an oblique bore 98 to intersect one of the lateral ball carrying passages 92. The forward end of each actuating rod is beveled as shown at 98*a* whereby outward longitudinal movement of the rod 96 in the bore 98 moves the ball out into its locking position. Normally the armature 97 is moved to this locking position by a compression spring 99. When any solenoid 95 is energized, however, and its armature 97 is drawn inwardly into the coil 100, the beveled forward end 98 of the actuating rod 96 is removed from the ball 93 permitting the same to retract into its passageway 92 and leave the vertical bore 91 free for vertical movement of the punch 69 carried therein. Only slight pressure of a punch pin 69 is required to push the ball 93 out of the way, once the rod 96 is retracted.

Due to the arrangement of printing wheels in conjunction with the pin-locking assembly, there is insufficient space to place all of the gate operating solenoids 95 in the bank projecting from the left end of the pin box 68. Accordingly, four of the solenoids 95 are mounted directly to the front of the pin box 68 as indicated at 95*a* in Figure 14 and, as shown in Figure 16, the solenoids at 95*a* do not require gating balls as in the other gates, but extend the actuating member of the solenoid directly into the bore 91 as shown in Figure 16.

The static information punch pins 67 are normally in a "down" position when unlocked and the unused pins are retracted just prior to the punching operation by contact with the master card hereinafter to be described in more detail. On the other hand, the time punching pins 69 must be normally positioned with their lower or punching ends well above the gate balls, so that only particular pins required to punch the then time will move to "down" position during the punching operation. This in turn requires that the time punching pin array comprising the pins 69 have an exaggerated vertical movement with respect to the pin box 68 during the punching operation. To this end, the upper ends of the time punching pins 69 having heads 69*b* as shown in Figure 15 are carried in bores 69*a* in a vertically movable carrier 105 which is movable in a rectangular guideway 106 in the pin box 68. The carrier 105 is formed with continuations 69*a* of the respective pin carrying bores 91 which are broached as shown at 107 to carry the heads 69*b* for vertical movement therein, compression springs for urging the pins downwardly being provided at 108 as in the case of the previously described pin mounting.

The carrier 105 is supported at the left-hand end of rocking lever 109 which is supported on a fixed fulcrum 110 mounted to the upper surface of the pin box 68. The right-hand end of the lever 109 is linked through a connecting rod 111 and a compression spring 112 to the under surface of the motor mount plate 53.

Figures 4, 5, 6:
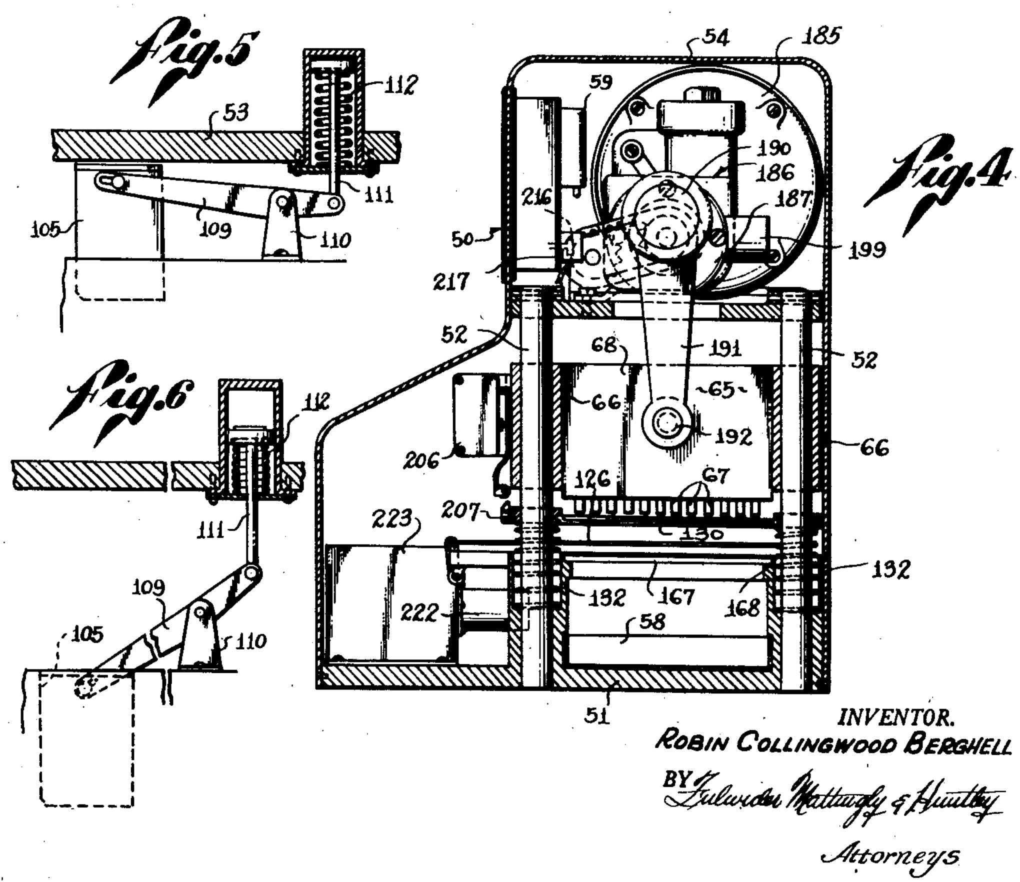
Figure 4 is an elevational section taken on the line 4—4 in Figure 2.
Figures 5 and 6 are sequential operational views of portions of the mechanism shown in Figure 2.

Thus as shown in Figures 5 and 6, when the punch carriage moves downwardly, the lever 109 rocks to move the carrier 105 downwardly in the guideway 106, whereby to lower such of the pins 69 as are unblocked to a position wherein the locking plate 75 may engage the upper notch in such pins thus locking each such pin in a punching position with the lower end thereof projecting below the surface of the pin box 68. Compression of the springs 108 permits such pins as are blocked by the balls 93 to remain up during the presetting operation just described. Pins which remain in "up" position are further locked by engagement of the locking plate 75 with the lower notch 79 in such pin as is shown in Figure 31.

As above stated, one of the functions of the present unit 50 is to print a visible time record on a stub portion of the blank card as well as the coded record reproduced by the punched hole pattern. The visual record is produced by a plurality of conventional type wheels 120, 121, and 122 mounted on concentric shafts 123, 124, and 125 as shown in Figure 14. The type wheels 120, 121, and 122 and their respective shaft mountings are carried on the punch carriage 65 and thus move downwardly with the same. A conventional inked ribbon 126 is supported immediately below the type wheels whereby to imprint a record on the underlying card when the type wheels are pressed downwardly against the same with the ribbon 126 interposed.

The details of the type wheels, the mechanical operation and interconnection thereof, and the support of the inked ribbon being essentially the same as in a conventional time-clock, further detailed description thereof is deemed unnecessary herein. Conventional manual controls for resetting the type wheels and the indicating clock are provided as in conventional time clocks and the like.

*Master card and support assembly therefor*

Turning now to a discussion of the master card support assembly, reference should be had to Figures 4, 7, 9, 11, and 27.

In the punching-in operation of the unit 50, the punch pins 67, as above stated, are pre-set in their desired arrangement by the contact with the master card, with the identification card, and with date encoding means during the initial part of the downward movement of the punch carriage 65.

The master card 113 (see Figure 9) includes a plurality of rectangular areas each having therein a number of columns of punch positions whereby encoded numerical data may be punched into each of the areas. The data to be recorded in each area are evident from the designations printed on the card with the exception of the area indicated at 114, which is reserved for various special types of inforamtion which may be required for a particular job order. It is desired that all of the encoded information punched into the card 113 be transferred to a record card in a manner to be described hereinafter.

The employee identification card 141 is a smaller rectangular card bearing the usual printed identification and picture of the particular employee, and in addition has an area 116 in which the clock number and other encoded statistical data relating to the employee are punched.

The master card and the identification card are each supported on a master card support plate 130 (see Figure 9) which is horizontally disposed immediately below the punch carriage 65 in a frame 129, having corner bearings 131 enclosing the posts 52. The frame 129 is slidable vertically on the posts 52, and is normally held in an upper limiting position by compression springs 132 surrounding the posts 52 under each bearing 131. Vertical movement of the frame 129 is limited by pins 133 riding in closed-end keyways 134 milled in the posts 52.

The master card support plate 130 is supported in horizontal tracks 130*a* formed in the frame 129 so that the plate 130 may be slide longitudinally through the opening 55 for the purpose of positioning the master card and the identification card on the master card support plate or removing such cards after the punching operation. The horizontally sliding movement of the plate 130 in the guides 130*a* is limited by a stop pin 135 running in a closed-end groove or recess 136 in the frame 129.

The master card 113 and the employee identification card 141 are received in appropriate rectangular recesses in the upper surface of the master card support plates 130. The rectangular recesses 142 and 143 in which the master card and identification card, respectively are received are proportioned to fit each card closely whereby to position the same accurately with respect to the overlying pin box. The plate 130 is perforated at all possible pin positions whereby any pin which passes through a perforation in the overlying master card or identification card may also pass through the plate 130 into a punching position below the lower surface of the plate 130.

In an area designated generally at 144 in Figures 9, 25 and 26, is a group of perforations in the plate 130 which serve to pass the pins which encode the date. The month, day, and year is set into the area 144 by inserting plugs 145 into all of the non-used apertures or perforations in the area 144, whereby to permit only certain pins 67 to pass through the area 144 to punch the appropriate date into the underlying blank card.

The time punching pins 69 pass through the plate 130 in the area generally designated at 146 in Figure 9. As will be described in more detail hereinafter, it is desired, during the "punching out" operation, to block all static data punching pins 67 and leave the time punching pins 69 as the only operative pins passing through the plate 130. The just described type of blocking is accomplished by moving the plate 130 longitudinally as hereinafter described so as to misalign all of the perforations therein and to prevent the static data pins 67 from passing through. In order that the just described misalignment will still permit the time punching pins 69 to pass through the plate and punch the "out" time, a plurality of slots 147 are formed in the plate 130 in the area 146 whereby the time punching pins 69 may pass through the plate 130 in spite of the slight longitudinal displacement thereof.

As earlier stated herein, one of the objects of the present invention is to produce a visual record on the time card as well as the coded punch hole record. As previously mentioned, the time is stamped by means of type-wheels 120, 121, and 122. An aperture 148 is formed in the plate 130 immediately below the type-wheels to permit the same to move downwardly to stamp the underlying record card.

In similar fashion, the name and clock number of the employee is printed on the stub portion of the record card by type formed in an embossed plate 115 mounted on the under-surface of the identification card 141, an aperture 149 being formed in the plate 130 to permit the embossed plate 115 to operate on the underlying record card.

The slidable plate 130 is held or indexed firmly in its innermost position by a permanent magnet 151 which is movably mounted to the frame 129 as can be seen in Figures 7 and 7*a*. The plate 130 being of a magnetic material is held firmly in place at the end of its track so long as it contacts the magnet 151. After the punching operation, the master card supporting plate 130 is ejected longitudinally by a solenoid 152 mounted to a cross-member 153 in the frame 129. The ejector mechanism includes the armature 154 of the solenoid 152 carrying a transverse yoke 155 and thrust rods 156 which push the plate 130 to the right (in Figure 7) to break its contact with the magnet 151 when the solenoid 152 is energized. Retraction springs 157 retract the rods 156 when the solenoid is de-energized.

It is desired during the "out" punching operation that the indexed position of the master card support plate 130 be shifted slightly, longitudinally, in order to prevent static information punch pins 67 from passing through the plate 130. To this end the magnet 151 is mounted for slight longitudinal motion in a guideway formed in the cross-member 153. Outward motion (to the right in Figure 7) of the magnet 151 is limited by a stop pin 153*a*, secured in the cross-member 153. The aforesaid longitudinal shift of the indexing magnet 151 is accomplished by a solenoid 158 mounted to the frame 129 and linked to the magnet 151 by a pivoted lever 159 carried on a fixed pivot 159*a* and drivingly connected to the magnet 151 by a pin 151*a* fixed in the latter.

Energization of the solenoid 158 shifts the magnet forwardly in the direction of the double-headed arrow shown on the magnet in Figure 7*a* and the return spring in the solenoid 158 returns the magnet to its original position as shown in Figure 7 when the solenoid 158 is de-energized.

*Record card and support assembly therefor*

Turning now to a description of the record card and its supporting assembly, the details are best seen in Figures 8, 10, and 27.

The appearance of the blank card 71 after it has been punched in the unit 50, and before it has been put through certain conventional automatic processing apparatus, is shown in Figure 10. It will be seen that the record card 71 is comprised of a punched section 160 and a printed stub portion 161. Referring first to the punched section 160, the purposes of the various areas are evident from the designation at the top of each particular area and will be seen to correspond in general to the areas and functions noted on the master card.

The area labeled "hours" and indicated at 162 in Figure 10 is for an encoded representation of the actual number of hours spent on the subject job order. This figure is computed by conventional punched card accounting apparatus which automatically subtracts the "time-in" from the "time-out." Additionally, if desired, the actual labor cost can be computed and entered on the record card by recording the particular employee's hourly rate in the area 163 and putting the card through an accounting machine which multiplies the elapsed hours indicated in the area 162 by the rate.

The stub portion 161 is attached to the punched card portion 160 by an offset line of perforations indicated generally at 164, the purpose in offsetting the perforations being to leave a clean die-cut edge at the left hand end of the punch card portion 160 when the stub 161 is removed. A clean edge is necessary for proper alignment of the card in automatic data handling equipment.

The record card blank is supported on a plate 167 which also serves as the female-die in the punching operation. The card 71 is inserted through the opening 55 and is held in place by lateral grooves or guideways 168 in the plate 167.

When the card 71 is inserted into the guideways 168 as shown in Figure 22 and pushed all the way into the unit, the rear or stub end of the card contacts an ejector slide 170, which is movably mounted for longitudinal sliding movement on the rearward end of the plate 167. Contact of the card 71 with the slide 170 moves the latter rearwardly extending a light ejecting spring 171. When the card 167 and the slide 170 reach their rearmost position, the slide 170 is latched in place by a latch member 172 formed as an extension of the armature 173 of a solenoid 174. The slide is shown in latched position in Figure 23. A small compression spring (not shown) in the solenoid 174 urges the armature 173 upwardly so as to engage the latch member 172 with the slide 170 so long as the solenoid 174 is not energized. After the punching operation is completed, energization of the solenoid 174 serves to draw the latch member 172 downwardly releasing the slide 170 and permitting it to eject the card to the right as can be seen in Figures 22 and 23.

In the "punching-out" operation, only the time is punched into and printed on the record card 71. The same array of time punching pins 69 are employed to punch the "out" time as were used to punch the "in" time. Thus, it is necessary to change the relative alignment of the time punching pins 69 and the card 71 in order to punch the "out" time in a different area on the card. This is accomplished by shifting the card 71 horizontally forward as indicated by the arrow 175 in Figure 8. To accomplish this lateral shift, the blank card support plate 167 is mounted for sliding movement on supporting tracks or guideways 176 and 177 forming a part of the base 51. The plate 167 is retained in place in its tracks by a plurality of small rollers 178 projecting into grooves 167*a* in the ends of the plate 167. The rollers 178 are mounted for rotation on axes which are fixed to the tracks 176 and 177.

The plate 167 is shifted laterally by a solenoid 179 which operates through a bell-crank 180 and a pair of levers 181 and 182 which are linked to the forward edge of the plate 167 by pins 183 movable in arcuate slots 184. The bell crank 180 and the two levers 181 and 182 are supported on fixed pivots on the underside of a horizontal forward portion 176*a* of the track or guideway supporting the plate 167 to the appropriate "punch-out" position.

Since it is necessary that the female die apertures in the plate 167 align accurately with the overlying punch pins 67 and 69, an additional alignment dowel or lug 129*a* is mounted on the underside of the master card supporting frame 129 (see Figures 36 and 37) and in a position to enter one or the other of a pair of relatively snugly fitting sockets 167*b* in the end of the plate 167. Two sockets 167*b* are provided so that the dowel 129*a* may engage an aligning socket 167*b* irrespective of whether the plate 167 is in "punch-in" or "punch-out" position. The dowel 129*a* is longer than the amount by which the punch pins extend below the master card supporting plate so as to enter the socket 167*b* and align the plate 167 before the punch pins engage and pass through the blank card.

*Punch drive assembly*

Figure 3:
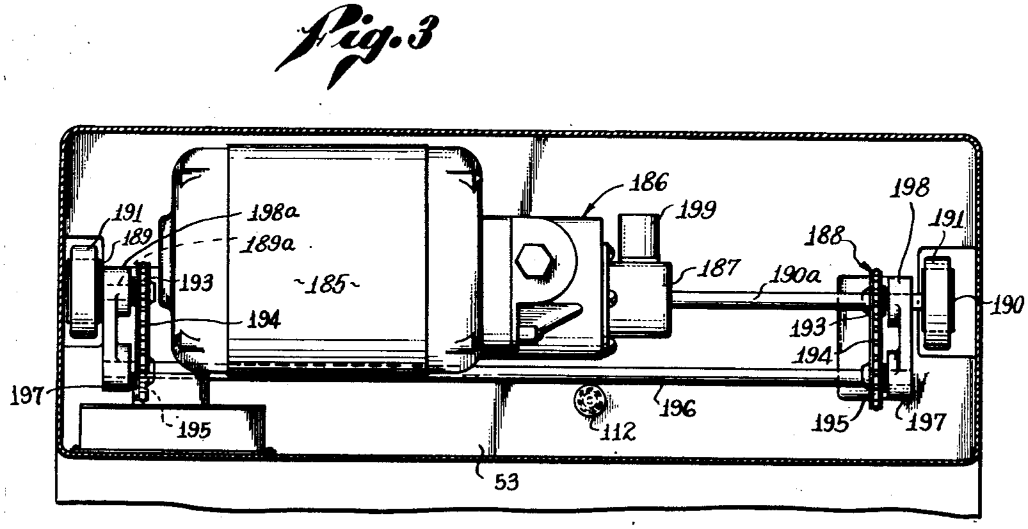
Figure 3 is a fragmentary horizontal section taken on the line 3—3 in Figure 2.

The operational cycle herein described, once initiated by the manual control lever 60, is entirely automatic and is electrically powered. The drive assembly for effecting the downward punching movement of the punch carriage 65 is mounted on the motor plate 53 (see Figures 2, 3, and 4) and comprises an electric motor 185, a gear reduction 186, an electrically actuated single revolution clutch 187, and a sprocket drive assembly 188 connected to synchronously drive a pair of eccentrics 189 and 190. The eccentrics 189 and 190 are mounted on shafts 189*a* and 190*a* respectively and are connected by connecting rods 191 and wrist pins 192 to the opposite ends of the punch carriage 65. Thus it will be seen that each revolution of the eccentrics 189 and 190 causes a single cycle of downward and upward movement of the punch carriage 65.

The sprocket drive assembly includes a sprocket 193 on each of the shafts 189*a* and 190*a*, each of which drives through a sprocket chain 194 one of a pair of equal diameter sprockets 195 on the opposite ends of an interconnecting jack-shaft 196 carried in journal bearings 197 formed as part of a pair of pillow blocks 198 secured to the motor support plate 53. The pillow blocks also journally support the shafts 189*a* and 190*a* at 198*a*.

The single revolution clutch 187 is of the conventional type which when actuated, engages the drive for a single revolution at the completion of which the clutch 187 is automatically disengaged. The drive remains disconnected until the single revolution clutch 187 is again actuated by energization of a solenoid 199 connected thereto.

The details and construction of single revolution clutches being well-known in the art, no further detailed description thereof is deemed necessary herein. Suffice it to say, that once the circuit to the solenoid 199 is completed, the same must be broken and remade to produce another revolution of the eccentrics 189 and 190.

*Control and operational sequencing assembly and circuit*

The elements of the unit 50 heretofore described are functionally inter-related by means of an electric circuit and certain switches and solenoids, the details and circuitry of which may be best seen in Figure 38.

The electric power to operate the unit 50 is supplied from a conventional source at an input connection indicated generally at 200. While for purposes of simplification in the wiring diagram, the motor and the solenoids have all been indicated as operating from the same source of electric power, it will be realized that in practice, it is preferable to supply the motor with electric current at a higher voltage than that necessary to operate the solenoids. Similarly, direct current solenoids are preferred over alternating current solenoids. Also for purposes of simplification in the drawing, the ground return leads from various of the electrical elements are omitted, such elements merely being indicated in the drawing as connected directly to the ground. Solenoids are designated in the drawing by the abbreviation Sol. and switches by the abbreviation Sw. Unless otherwise indicated, all switches are single-pole, single-throw normally open.

As shown in Figure 38, the manual actuating lever 60 constitutes a portion of an electrical switch having three possible positions i. e., "open," or "in," or "out." In the drawing, the switch lever 60 is shown in the normal open position. Movement of the lever 60 to either of the "in" or "out" positions closes a circuit through a lead 201 to energize the motor 185. However, due to the interposition of the clutch 187, rotary power is not delivered to the punch carriage until the clutch 187 is engaged by operation of the solenoid 199.

Voltage is delivered to the solenoid 199 through leads 202, 203, and 204, a safety switch 205 being interposed to prevent engagement of the clutch except when the door 56 is closed, as shown schematically in Figure 38. This arrangement avoids the possibility that an operator may have his fingers projecting through the opening 55 into the space between the punch carriage and the underlying structure when the operating lever 60 is operated.

Closure of the switch lever 60 with the door 56 in its closed position, then, energizes the solenoid 199, engages the clutch 187, and causes the motor which is then running to operate the punch carriage through a single punching cycle previously described. During the downward travel of the punch carriage 65, a switch 206 carried thereon engages a switch operating abutment 207 mounted on the master card support frame, whereby to complete a circuit through a lead 208 to the solenoid 80 to actuate the pin locking plate 75. Thus, the punch pins 67 and 69 are locked in their then position when the punch carriage 65 reaches a predetermined point in its downward travel.

During the upward or return travel of the punch carriage 65, the actuating member of the switch 206 is removed from the abutment 207 whereby to unlock the pin locking plate 75.

When the switch lever 60 is moved to "out" position, a circuit is completed through a lead 209 to the plate shift solenoid 158 which thereupon actuates to shift the magnet 151 and the master card support plate to misalign the apertures corresponding to the static information pins 67 as previously described.

Closure of the switch lever 60 to "out" position also completes a circuit through leads 209 and 210 to the solenoid 179 which effects a lateral movement of the blank card support whereby to place the same in a position to receive the "out" time punch pins.

When either the "punching-in" or "punching-out" operation has been completed, raising the door 56 to its upper limit actuates a switch 211, which completes a circuit through leads 212 and 213 to the solenoids 152 and 174 respectively which operate to eject the master card 113 and the record card 71 through the opening 55. The upper limit switch 211 has a relatively strong return spring holding it in normally open position whereby the circuits to the card ejecting solenoids 152 and 174 are closed only so long as the door is forcibly held in its extreme upper position. Otherwise the door, while open sufficiently to insert the cards, is slightly below its top position and the switch 211 is open.

It will be seen that the clock 59 is at all times energized through the leads 202 and 215. As long as the motor of the clock 59 is running, it operates a cam 216 which in turn actuates a switch 217 every thirty-six seconds (1/100 hour) to produce timed pulses in the circuits including the leads 218 and 219. Each pulse in the lead 219 actuates a solenoid 220 which in turn actuates a conventional step-counter escapement 221 to advance the type-wheels.

The bank of solenoids 95 and 95a which operate the pin gates for encoding the time, are all controlled by three interconnected rotary switches 225, 226, and 227 shown schematically in Figure 38.

Each pulse in the lead 218 actuates a solenoid 222 which operates through an escapement 223 to advance a contact arm 224 in the first order rotary switch which is a ten-position switch, each position of which represents the passage of 1/100 of an hour. The segmental contacts in the switches are indicated schematically in Figure 38 and each segment is designated by the digit which it represents.

A step-action gear train, such as one incorporating a Geneva movement of well known design, interconnects the rotary contact 224 of the switch 225 with a rotary contact 228 of the second order switch 226, whereby each complete revolution of the contact 224 advances the contact 228 by one-tenth of a revolution.

In similar manner, the rotary contact 228 is connected to a rotary contact 229 of the third order switch 227 by a step-action gear train whereby each complete revolution of the contact 228 causes the contact 229 to advance by one twenty-fourth of a revolution. Thus the solenoids 95 are continuously operated in the appropriate order and arrangement so that at any given time, only such time indicating punch pins 69 as indicate that particular instant of time are free to move downwardly if the punch carriage 65 is actuated as previously described.

While various encoding systems may be employed in connection with the apparatus heretofore described, the particular system used in the illustrative embodiment is one in which any one of the digits between "0" and "9" is indicated in the appropriate column, by the relative positions of either one or two punch holes, there being six possible positions. In this system, the digit "0" is indicated by punching a hole in the "0" position at the top of the column, the digit "1" is indicated by punching a hole in the "1–2" position in the column, and the digit "2" is indicated by punching a hole in the "1–2" position and also a hole in the "9" position in the column. The remaining odd numbers are indicated by a single hole in the appropriate position and the remaining even numbers are indicated by two holes in similar fashion to the digit "2," as above described.

In this connection it will be noted that only three solenoids are required in the ten hour column of the time and coding assembly since only three possible digits, to wit "0," "1," or "2" need be indicated in that column in order to designate any time between zero and twenty-four hours.

*Operation*

The mode of operation of the individual sub-assemblies will be apparent from the foregoing description. The overall operational cycle will now be described.

In preparation for the punching-in operation, the operator of the unit 50 raises the door 56 holding the same against its upper limiting switch thus causing the ejector mechanism to push the master card support plate 130 outwardly through the opening 55 to a position where it may be grasped and withdrawn to its outer limiting position. The operator then places the master card 113 and the employee identification card 141 in their respective positions on the plate 130 and presses the plate back into the unit where it is held in place by its contact with the magnet 151.

At this point, it will be appreciated that the ejecting solenoid 152 is de-energized due to the fact that the door 56 is not being held forcibly against its upper limiting switch 211.

The operator now slides a blank record card 71 into position on its support plate 167 pressing the same rearwardly to cock the ejecting mechanism and causing it to be latched in place by the latch member 172.

The door 56 is now closed, closing the lower limit switch 205, thus placing the circuit in readiness for the "punching-in" operation. The switch lever 60 is now moved to the "punch-in" position, setting into operation the mechanism previously described causing the punch carriage 65 to move downwardly in its punching cycle. The initial downward movement of the carriage 65 operating through the linkage which includes the lever 109, lowers the time punching pin carrier 105 whereby to lower the unblocked time punching pins 69 into appropriate punching position. During the initial part of the carriage motion, while the pins 69 are being moved downwardly through such gates as are open, and into position to be locked by the locking plate 75, the compression spring 112 is not compressed, the motion being permitted by the compression of the springs 72 above the pins. Once the pins 69 are locked, however, the carrier 105 cannot move further with respect to the pin box 68 and therefore the additional carriage motion is permitted by compression of the compression spring 112.

At the same time, the downward movement of the carriage 65 and the pin box 68 presses the static information punch pins 67 against the surface of the master card and the identification card permitting such pins as are aligned with apertures in the last mentioned cards, to pass through the same and also through the master card supporting plate 130.

The last mentioned pins project below the plate 130 a sufficient distance to punch holes in the underlying record card when the punch carriage 65 reaches its lower limit. Prior to the carriage 65 reaching a point where the pins 67 contact the surface of the blank card 71, however, the actuating member of the switch 206 reaches the abutment 207 and the switch is closed causing the locking plates 75 to move into engagement with the notches in the punch pins locking the same in their then position.

With the pins 67 and 69 locked in punching position, the punch carriage 65 then continues downwardly punching the appropriate holes in the record card 71 as shown in Figure 29, the master card support plate being carried downwardly with the punch carriage due to the contact of the sleeve members 66 with the bearing members 131 at the corners of the master card support frame. Simultaneously, the "in" time and the employee's name and card number are printed on the stub portion 161 of the card 71 as previously described.

During the upward return part of the cyclic movement of the punch carriage 65, the actuating member of the switch 206 drops off the abutment 207 permitting the return spring in the solenoid 80 to move the pin locking plate 75 back to unlocked position whereby to release all of the punch pins 67 to return to their lowermost positions when the punch carriage 65 and the pin box 68 return to their upper position. Similarly the upward return movement of the punch carriage 65 lifts the time punch pins 69 back to their original positions above the gate mechanism.

A switch latching mechanism of the usual design (not shown) is provided to hold the contacts of the switch 60 closed until the punching cycle is completed and the carriage 65 has returned to its initial uppermost position.

Having punched the static information and "in" time into the record card, the operator now removes the same and also the master card and identification card from the unit, ejecting mechanisms for the respective cards being operated by moving the door 56 upwardly against its upper limit switch. The record card is then stored in a temporary rack, while the workman completes the particular job at hand. When the job has been completed and the worker returns to "punch-out," the operator of the unit 50 replaces the appropriate record card in the machine and actuates the switch lever 60 in the out-punch direction, thus causing the carriage to again go through its punching cycle in the manner previously described. This time, however, the circuit through the lead 209 being closed, the master card support plate is shifted slightly through the operation of the shift solenoid 158 and the blank card is shifted laterally through the operation of the solenoid 179, so that only the "out" time is punched and printed in the appropriate areas of the record card. During the "out" punching operation, it is unnecesary to place the master card and identification card in the unit.

While the punching unit 50 shown and described herein is fully capable of achieving the objects and providing the advantages heretofore stated, it will be realized that the mechanisms are capable of considerable rearrangement and modification without departing from the spirit of the invention. For this reason, I do not mean to be limited to the precise form and arrangement shown and described, but rather to the scope of the appended claims.

I claim:

1. Apparatus for preparing records of the type in which information is recorded in the form of a pattern of punched holes, which apparatus comprises: a punch carriage mounted for movement in a given path; a plurality of punches on said carriage and independently movable with respect thereto between punching and non-punching positions; pre-setting means having a predetermined pattern of passages therein each adapted to pass one of said punches and positioned in the path of said carriage whereby initial movement of said carriage impinges said punches against said pre-setting means with an initial relatively small force to retract to non-punching position such punches as are not aligned with one of said passages; means to support a record blank in said path in position to be punched by such of said punches as are non-retracted, whereby to reproduce said pattern in said blank and, means engageable selectively to apply additional force to said non-retracted punches to move the same with said carriage to punch said record blank.

2. Apparatus for preparing records of the type in which information is recorded in the form of a pattern of punched holes which apparatus comprises: a punch carriage mounted for movement in a punching direction in a given path; a plurality of punches on said carriage and independently movable with respect thereto between punching and non-punching positions; pre-setting means having a predetermined pattern of passages therein each adapted to pass one of said punches and positioned in the path of said carriage whereby initial movement of said carriage in said punching direction impinges said punches against said pre-setting means to retract to non-punching position such punches as are not aligned with one of said passages; locking means in said carriage adapted to lock all of said punches against said independent movement thereof when said punches are retracted as aforesaid; and means to support a record blank in said path in position to be punched by such of said punches as are not retracted, upon continued movement of said carriage in said direction whereby to reproduce said pattern in said blank.

3. Apparatus for preparing records of the type in which information is recorded in the form of a pattern of punched holes which apparatus comprises: a punch carriage mounted for movement in a given path; a plurality of punches on said carriage independently movable with respect thereto between punching and non-punching positions; means to support a pre-setting member having a predetermined pattern of perforations therein, in the path of said carriage whereby initial movement of said carriage impinges said punches against said pre-setting member to retract to non-punching position such punches as do not align with perforations in said member; means to support a record blank in said path in position to be punched by such of said punches as are non-retracted whereby to reproduce said pattern in said blank; and locking means to carry said non-retracted punches with said carriage in said path.

4. Apparatus for preparing records of the type in which information is recorded in the form of a pattern of punched holes which apparatus comprises: a punch carriage mounted for movement in a given path; a plurality of punches mounted on said carriage and independently movable with respect thereto between punching and non-punching positions; means to support a plurality of separate pre-setting members each having a predetermined pattern of perforations therein and said pre-setting members being positioned in a predetermined relative relationship in the path of said carriage whereby initial movement of said carriage impinges said punches against said pre-setting members to retract to non-punching position such punches as do not align with a perforation in one of said members; means to lock such punches as are non-retracted to said carriage; and means to support a rocord blank in said path in position to be punched by said non-retracted punches whereby to reproduce the over-all pattern of perforation in both said members, in said blank.

5. Apparatus for preparing records of the type in which information is recorded in the form of a pattern of punched holes which apparatus comprises: a punch carriage mounted for movement in a given path; a plurality of punches on said carriage and independently movable with respect thereto between punching and non-punching positions; pre-setting means having a punch lock and pattern means with a predetermined pattern of passages each adapted to pass one of said punches and positioned in the path of said carriage whereby initial movement of said carriage impinges said punches against said pattern means to retract to non-punching position such punches as are not aligned with one of said passages; means actuated by engagement of said carriage and pattern means to actuate said punch lock to immobilize said punches with respect to said carriage; means to support a record blank in the path of said carriage in position to be punched by such of said punches as are not retracted, whereby to reproduce said pattern in said blank; printing means carried by said carriage to imprint visible indicia on said blank when the same is punched as aforesaid; remotely operable means on said carriage to close selected ones of said passages whereby to vary said pattern; remotely operable means on said carriage to change the indicia imprinted by said printing means; and remote control means connected to said passage closing and indicia changing means to coordinate the operation thereof.

6. Apparatus for preparing records of the type in which information is recorded in the form of a pattern of punched holes which apparatus comprises: a punch carriage mounted for movement in a given path; a plurality of punches on said carriage independently movable with respect thereto between punching and non-punching positions; pre-setting means having a predetermined pattern of passages formed therein each adapted to pass one of said punches and positioned in said path, said pre-setting means being adapted to control said independent movement of said punches by engagement therewith in response to said carriage movement, whereby to place in punching position, only such of said punches as align with passages in said pre-setting means; locking means actuated by movement of said carriage past a predetermined point in said path to immobilize said punches with respect to said carriage in the positions therein established by said pre-setting means; and means to support a record blank in said path in position to be punched by such of said punches as are in punching position, whereby to reproduce said pattern in said blank.

7. In apparatus for duplicating in a record blank, the pattern of punched holes in a master record: a carriage mounted for motion in a given path; a plurality of punches mounted in said carriage for movement therein between punching and retracted positions; means to support said master record adjacent said carriage to first engage said punches when said carriage is moved, whereby to move to punching position in said carriage such of said punches as correspond to holes in said master record pattern, and to move to retracted position in said carriage the remainder of said punches; means to lock said punches in said punching position; means to support said record blank in the path of said carriage movement at a point therein following the point of said first engagement of said punches whereby to punch a hole in said blank with each of said punches which is in punching position; and power means to move said carriage in said path.

8. In apparatus for duplicating in a record blank, the pattern of punched holes in a master record: a carriage mounted for motion in a given path; a plurality of punches mounted in said carriage for movement therein between punching and retracted position; means to support said master record adjacent said carriage to first engage said punches when said carriage is moved whereby to move to punching position in said carriage such of said punches as correspond to holes in said master record pattern, and to move to retracted position in said carriage the remainder of said punches; means to lock said punches in said punching position; means to support said record blank in the path of said carriage movement at a point therein following the point of said first engagement of said punches whereby to punch a hole in said blank with each of said punches which is in punching position; power means to move said carriage in said path; control means for said power means including an actuating member movable to either of two positions in each of which said power means is actuated to effect a single cycle of punching and return movement of said carriage in said path; and means connected to said blank supporting means to shift the same transversely with respect to said path, said shifting means being also connected to said control means to be actuated thereby when said member is moved to a given one of said positions whereby to reproduce said pattern as aforesaid in either of two areas of said blank depending upon the position to which said actuating member is moved.

9. In apparatus for duplicating in a record blank, the pattern of punched holes in a master record: a carriage mounted for translatory movement in a given path; a plurality of punches on said carriage parallel to said path and movable in said carriage between advanced and retracted positions; a plate in the path of said carriage having a plurality of die apertures therein, one aligned with each of said punches; retainer means on the punch-adjacent surface of said plate adapted to receive and align a record blank overlying said apertures, said plate being so positioned with respect to said carriage path that only punches in advanced position enter said die apertures when said carriage is moved as aforesaid whereby to punch holes in said blank on said plate; presetting means engageable by said punches when said carriage is moved as aforesaid, said presetting means having a plurality of passages arranged in a predetermined pattern, each passage adapted to pass one of said punches whereby to advance a pattern of said punches corresponding to the pattern of passages in said presetting means; and locking means to lock said punches in advanced position in said carriage whereby when said carriage is moved as aforesaid, holes are punched in said blank in said predetermined pattern.

10. In apparatus for duplicating in a record blank, the pattern of punched holes in a master record: a carriage mounted for translatory movement in a given path; a plurality of punches on said carriage parallel to said path and movable in said carriage between advanced and retracted positions; a plate in the path of said carriage having a plurality of die apertures therein, one aligned with each of said punches; retainer means on the punch adjacent surface of said plate adapted to receive and align a record blank overlying said die apertures, said plate being so positioned with respect to said carriage path that only punches in advanced position enter said apertures when said carriage is moved as aforesaid whereby to punch holes in said blank on said plate; presetting means engageable by said punches when said carriage is moved as aforesaid toward said plate, said presetting means having a plurality of passages arranged in a predetermined pattern, each passage adapted to pass one of said punches whereby to advance a pattern of said punches corresponding to the pattern of passages in said presetting means to punch holes in said blank arranged in said pattern; locking means in said carriage adapted when actuated to lock all of said punches in their then positions in said carriage; and an actuator for said locking means, said actuator having a movable member on said carriage and a relatively fixed member arranged in the path of said movable member and positioned to engage said movable member during the movement of said carriage at a point in said path following the point at which said punches are advanced by said presetting means and prior to engagement of said punches with said plate.

11. Apparatus for preparing records of the type in which information is recorded in the form of a pattern of punched holes, which apparatus comprises: a punch carriage mounted for translatory movement in a given path and direction and having a plurality of bores therein parallel to said path; a lock plate movably supported in a transverse plane in said carriage intersecting all of said bores, said plate having a plurality of apertures therein, one aligned with each of said bores when said plate is in a given unlocked position; a punch pin in each of said bores with its punching end extending in said direction and movable in said bore between advanced and retracted positions, each pin having a pair of lateral notches therein, one notch in each pin positioned to lie in said plane when said pin is in retracted position and the other notch therein positioned to lie in said plane when said pin is in advanced position whereby lateral displacement of said plate with all of said pins in either advanced or retracted position engages edges of said plate apertures with one or the other of said notches in each pin whereby to lock each pin in its then position; presetting means having a predetermined pattern of passages formed therein, each passage adapted to pass one of said pins and positioned in said path, said presetting means being adapted to control said pin movement in said carriage in response to movement of the latter in said direction, whereby to place in advanced position only such of said pins as are aligned with passages in said presetting means; and means to support a record blank in said path in position to be punched by such of said pins as are advanced by said presetting means whereby to reproduce said pattern in said blank.

12. Apparatus for preparing records of the type in which information is recorded in the form of a pattern of punched holes, which apparatus comprises: a punch carriage mounted for translatory movement in a given path and direction and having a plurality of bores therein parallel to said path; a lock plate movably supported in a transverse plane in said carriage intersecting all of said bores, said plate having a plurality of apertures therein, one aligned with each of said bores when said plate is in a given unlocked position; a punch pin in each of said bores movable therein between advanced and retracted positions, each pin having a pair of lateral notches therein, one notch in each pin positioned to lie in said plane when said pin is in retracted position and the other notch therein positioned to lie in said plane when said pin is in advanced position whereby lateral displacement of said plate with all of said pins in either advanced or retracted position engages edges of said plate apertures with one or the other of said notches in each pin whereby to lock each pin in its then position; presetting means having a predetermined pattern of passages formed therein, each passage adapted to pass one of said pins and positioned in said path, said presetting means being adapted to control said pin movement in said carriage in response to movement of the latter in said direction, whereby to place in advanced position only such of said pins as are aligned with passages in said presetting means; actuating means for said locking plate including a movable member carried on said carriage and a fixed member positioned in the path of said movable member as the latter is carried by said carriage, said fixed member being so positioned with respect to said path as to engage and actuate said movable member at a point in said path and direction following the point of engagement with said presetting means, said movable actuating means being operatively connected to said lock plate whereby to move said plate to lock all of said pins after the same have been moved to advanced or retracted positions by said presetting means; and means to support a record blank in said path in position to be punched by such of said punches as are advanced whereby to reproduce said pattern in said blank.

13. Apparatus for reproducing punched tabulating cards comprising: a base; a plurality of upstanding vertical guideways secured to said base; a carriage mounted for reciprocal sliding movement along said guideways between predetermined limits; a plurality of punch pins parallel to said guideways and mounted for independent movement in said carriage between advanced and retracted positions therein, said punches being arranged in a group with one at every possible hole location in a punched card to be reproduced; a horizontal support plate mounted in the path of said carriage intermediate the limits of said reciprocal motion, said plate having a plurality of apertures therein one aligned with each of said pins whereby said carriage movement normally advances all of said pins through said respective apertures; means on the carriage-adjacent surface of said support plate to receive and align a punched card overlying said apertures whereby to block all of said apertures except where a punched hole in said card overlies an aperture; a lock in said carriage actuated by engagement of said carriage with said support plate to immobilize all advanced pins in said carriage; a horizontal die plate in the path of said carriage adjacent a limit thereof on the opposite side of said support plate from said carriage, said die plate having a plurality of die apertures therein, one aligned with each of said pins, whereby such of said pins as advance through eaid support plate enter die apertures when said carriage is moved to the limit of its motion toward said die plate; and means in said die plate to support a blank card overlying said die apertures whereby to punch a pattern of holes in said blank corresponding to the pattern in said first card when said carriage is moved as aforesaid.

14. Apparatus for reproducing punched tabulating cards comprising: a base; a plurality of upstanding vertical guideways secured to said base; a carriage mounted for reciprocal sliding movement along said guideways between predetermined limits; a plurality of punch pins parallel to said guideways and mounted for independent movement in said carriage between advanced and retracted positions therein, said punches being arranged in a group with one at every possible hole location in a punched card to be reproduced; a horizontal support plate member mounted in the path of said carriage intermediate the limits of said reciprocal motion, said plate having a plurality of apertures therein, one aligned with each of said pins whereby said carriage movement normally advances all of said pins through said respective apertures; means on the carriage-adjacent surface of said support plate to receive and align a punched card overlying said apertures whereby to block all of said apertures except where a punched hole in said card overlies an aperture; a horizontal die plate in the path of said carriage adjacent a limit thereof on the opposite side of said support plate from said carriage, said die plate having a plurality of die apertures therein, one aligned with each of said pins, whereby such of said pins as advance through said support plate enter die apertures when said carriage is moved to the limit of its motion toward said die plate; lock means in said carriage including a member movable into locking engagement with all of said pins to prevent said movement thereof in said carriage, an actuator carried in said carriage, and a relatively fixed abutment in the path of said actuator positioned and adapted to engage said actuator and move said member into said locking engagement at a point of said carriage movement after said pins have been advanced through said support plate, but prior to entrance thereof into said die apertures; and means in said die plate to support a blank card overlying said die apertures whereby to punch a pattern of holes in said blank corresponding to the pattern in said first card when said carriage is moved as aforesaid.

15. Apparatus for preparing records of the type in which information is recorded in the form of a pattern of punched holes, which apparatus comprises: a punch carriage mounted for movement in a given path and direction; a plurality of punches on said carriage and independently movable with respect thereto between punching and non-punching positions; spring means in said carriage engaged with said punches to urge the same to punching position; pre-setting means having a predetermined pattern of passages therein, each adapted to pass one of said punches and positioned in the path of said carriage whereby initial movement of said carriage in said direction impinges said punches against said presetting means to retract to non-punching position, such punches as are not aligned with one of said passages; locking means in said carriage adapted to lock all of said punches against said independent movement thereof when said punches are retracted as aforesaid; and means to support a record blank in said path in position to be punched by such of said punches as are not retracted, whereby to reproduce said pattern in said blank.

16. Apparatus for preparing records of the type in which information is recorded in the form of a pattern of punched holes, which apparatus comprises: a punch carriage mounted for translatory movement in a given path and having a plurality of bores therein parallel to said path; a lock plate movably supported in a transverse plane in said carriage intersecting all of said bores, said plate having a plurality of apertures therein, one aligned with each of said bores when said plate is in a given unlocked position; a punch pin in each of said bores movable therein between advanced and retracted positions; each pin having a pair of lateral notches therein, one notch in each pin positioned to lie in said plane when said pin is in retracted position, and the other notch therein positioned to lie in said plane when said pin is in advanced position; whereby lateral displacement of said plate with all of said pins in either advanced or retracted position engages edges of said plate apertures with one or the other of said notches in each pin whereby to lock each pin in its then position; a plurality of springs in said carriage, one in each of said bores to yieldably urge the pin therein to advanced position; presetting means disposed in said path and having a predetermined pattern of passages, each adapted to pass one of said pins when said carriage is moved, imperforate areas of said presetting means being disposed to engage and retract certain of said pins in said carriage as the latter moves toward said presetting means; actuating means for said lock plate mounted in said carriage and adapted to move said plate and lock said pins as aforesaid when said certain pins are retracted in said carriage; and means to support a record blank in said path in position to be punched by such of said pins as are not retracted by said presetting means whereby to reproduce said pattern in said blank.

17. Apparatus for combining and recording in a single punched record, static encoded data from a punched master record and variable encoded data, said apparatus comprising: a carriage mounted for motion in a given path; a first group of static data punches mounted in said carriage for movement therein between punching and retracted position; a second group of variable data punches mounted in said carriage for movement therein between punching and retracted positions; means to support said master record adjacent said carriage to first engage said static data punches when said carriage is moved whereby to move to punching position in said carriage such of said static data punches as correspond to holes in said master record, and to move to retracted position in said carriage the remainder of said static data punches; means to lock said static data punches in punching position in said carriage; variable data encoding means including a plurality of passageways positioned adjacent said carriage respectively in alignment with said variable data punches, said encoding means including means to close predetermined ones of said passageways when said carriage is moved as aforesaid, to move to punching position in said carriage such of said variable data punches as are aligned with open passageways and to hold in retracted position in said carriage the remainder of said variable data punches; and means to support said record blank in said path at a point therein following the point of said first engagement of said punches whereby when said carriage is moved as aforesaid, to punch a hole in said blank with each of said punches which is in punching position.

18. Apparatus for reproducing punched tabulating cards comprising: a base; a plurality of upstanding vertical guideways secured to said base; a carriage mounted for reciprocal sliding movement along said guideways between predetermined limits; a plurality of punch pins parallel to said guideways and mounted for independent movement in said carriage between advanced and retracted positions therein, said pins being arranged in a group with one at every possible hole location in a punched card to be reproduced; yieldable means in said carriage to urge each of said pins to advanced position; a horizontal support plate mounted for sliding movement along said guideways, said plate being normally positioned in the path of said carriage intermediate the limits of said reciprocal motion and having a plurality of apertures therein, one aligned with each of said pins whereby said carriage movement normally advances all of said pins through said respective apertures; means on the carriage-adjacent surface of said support plate to receive and align a punched card overlying said apertures whereby to block all of said apertures except where a punched hole in said card overlies an aperture; spring means connected between said base and support plate to yieldably support the latter in said normal position thereof whereby said carriage movement first impinges pins not aligned with holes in said card against the latter to retract such pins, and said carriage thereafter engages said support plate to move the latter with said carriage against the urging of said last-named spring means; locking means in said carriage adapted to be actuated by the engagement of said carriage with said support plate to lock all of said pins against said independent movement thereof in said carriage; a horizontal die plate in the path of said carriage adjacent a limit thereof on the opposite side of said support plate from said carriage, said die plate having a plurality of die apertures therein, one aligned with each of said pins whereby such of said pins as advance through said support plate enter die apertures when said carriage is moved to the limit of its motion toward said die plate; and means in said die plate to support a blank card overlying the die apertures whereby to punch a pattern of holes in said blank corresponding to the pattern in said first card when said carriage is moved as aforesaid.

19. In apparatus for duplicating in a record blank, the pattern of punched holes in a master record: a carriage mounted for motion in a given path; a plurality of punches mounted in said carriage for movement therein between punching and retracted positions; means to support said master record adjacent said carriage to first engage said punches when said carriage is moved, whereby to move to punching position in said carriage such of said punches as correspond to holes in said master record pattern, and to move to retracted position in said carriage the remainder of said punches; means to lock said punches in said punching position; means to support said record blank in the path of said carriage movement at a point therein following the point of said first engagement of said punches, whereby to punch a hole in said blank with each of said punches which is in punching position; and means to effect movement of said carriage in said path and to return the same to a rest position after punching said record blank as aforesaid.

20. Apparatus for duplicating the pattern of punched holes in a punched record comprising: a punch carriage mounted for movement in a given direction; a plurality of punches mounted in said carriage to be carried as a group thereby and for independent movement therein between extended and retracted positions; yieldable means in said carriage urging each of said punches independently to extended position; means for supporting a record blank in position to be punched by extended punches when said carriage is moved to a limit in said given direction; pre-setting means interposed in the path of the movement of said group of punches when said carriage is moved in said direction, said pre-setting means having a passage therein aligned with each punch to permit such punch to move with said carriage to said limit so long as said passage is open; passage-blocking means in said presetting means to block selected ones of said passages to engage and retact certain of said punches aligned therewith against the urging of said yieldable means when said carriage is moved as aforesaid; and locking means operable by movement of said carriage in said direction past the point of engagement of said passage-blocking means to lock such punches as are still extended, against retracting movement in said carriage.

21. Apparatus for preparing records of the type in which information is recorded in the form of a pattern of punched holes which apparatus comprises: a punch carriage mounted for movement in a given path; a plurality of punches on said carriage independently movable with respect thereto between punching and non-punching positions; means to support a pre-setting member having a predetermined pattern of perforation therein, in the path of said carriage whereby initial movement of said carriage impinges said punches against said pre-setting member to retract to non-punching position such punches as do not align with perforations in said member, said supporting means being engagable by said carriage moving as aforesaid and yieldable to permit said pre-setting member to move with said carriage after retraction of said punches as aforesaid; means to support a record blank in said path in position to be punched by such of said punches as are non-retracted whereby to reproduce said pattern in said blank; and locking means to carry said non-retracted punches with said carriage in said path.

22. In apparatus for duplicating in a record blank the pattern of punched holes in a master record and for recording other punched hole data in said record blank: a carriage mounted for motion in a given path; a first group of punches mounted in said carriage for movement therein between punching and retracted positions; means to support said master record adjacent said carriage in position to engage said first group of punches when said carriage is moved whereby to move to punching position in said carriage such as said punches in said group as correspond to holes in said master record pattern, and to move to retracted position in said carriage the remainder of said punches in said group; a second group of punches mounted in said carriage for movement therein between punching and retracted positions; means independent of said master card and actuated by movement of said carriage for pre-setting certain of said second group of punches in punching position in a desired pattern when said carriage is moved in a punching direction in said path; means to lock all of said punches in both groups in said punching positions thereof; means to support said record blank in the path of said carriage movement at a point therein following the point at which said punches are pre-set and locked as aforesaid, whereby to punch a hole in said blank with each of said punches in each group which is in punching position; and externally operable means to displace said master record supporting means in the plane thereof whereby to mis-align all holes in said master record with punches in said first group to retract all of said punches in said first group and leave operative only punches in said second group.

23. In apparatus for duplicating in a record blank the pattern of punched holes in a master record and for recording other punched hole data in said record blank: a carriage mounted for motion in a given path; a first group of punches mounted in said carriage for movement therein between punching and retracted positions; means to support said master record adjacent said carriage in position to engage said first group of punches when said carriage is moved, whereby to move to punching position in said carriage, such of said punches in said group as correspond to holes in said master record pattern, and to move to retracted position in said carriage the remainder of said punches in said group; a second group of punches mounted in said carriage for movement therein between punching and retracted positions; pre-setting means independent of said master card and actuated by movement of said carriage, said pre-setting means including a member having a plurality of gated passageways therein, each aligned with one of the punches in said second group, and a passage blocking member positioned adjacent each of said passages and operable selectively to close certain passages whereby to advance to punching position a certain pre-selected pattern of punches in said second group when said carriage is moved in the punching direction in said path; means to lock all of said punches in both groups which are in punching position whereby to hold the same immovable with respect to said carriage; and means to support said record blank in the path of said carriage movement at a point therein following the point at which said punches are pre-set and locked as aforesaid, whereby to punch a hole in said blank with each of said punches in each group which is in punching position.

24. The construction of claim 23 further characterised by having clock control means connected to said passage blocking members to continuously shift the positions thereof whereby the pattern of unblocked passages in said pre-setting means and the hole pattern punched by said second group of punches indicates the time at any given instant.

References Cited in the file of this patent

UNITED STATES PATENTS

| | | |
|---|---|---|
| 1,108,492 | Eggart | Aug. 25, 1914 |
| 1,812,620 | Braitmayer | June 30, 1931 |
| 2,018,420 | Robinson et al. | Oct. 22, 1935 |
| 2,134,815 | Elliott | Nov. 1, 1938 |
| 2,233,662 | Buster et al. | Mar. 4, 1941 |
| 2,664,815 | Schuessler | Jan. 5, 1954 |